(12) United States Patent
Xu

(10) Patent No.: US 8,774,948 B2
(45) Date of Patent: Jul. 8, 2014

(54) OPERATION AND CONSTRUCTION OF ELECTRIC POWER CONSUMING FACILITIES USING FACILITY MODELS

(76) Inventor: Wilsun Xu, Edmonton (CA)

(*) Notice: Subject to any disclaimer, the term of this patent is extended or adjusted under 35 U.S.C. 154(b) by 897 days.

(21) Appl. No.: 12/748,232

(22) Filed: Mar. 26, 2010

(65) Prior Publication Data

US 2010/0262310 A1 Oct. 14, 2010

Related U.S. Application Data

(60) Provisional application No. 61/169,189, filed on Apr. 14, 2009.

(51) Int. Cl.
*G05B 13/02* (2006.01)
*G06F 17/50* (2006.01)
*G06G 7/62* (2006.01)

(52) U.S. Cl.
CPC .......... *G06F 7/5004* (2013.01); *G06F 2217/78* (2013.01)
USPC ................... 700/31; 700/28; 700/29; 703/13; 703/18

(58) Field of Classification Search
USPC .............................. 700/28–29, 31; 703/13, 18
See application file for complete search history.

(56) References Cited

U.S. PATENT DOCUMENTS

| | | | |
|---|---|---|---|
| 4,197,576 A * | 4/1980 | Martin Sanchez | 700/31 |
| 7,219,069 B2 * | 5/2007 | Fouquet | 705/7.22 |
| 7,280,879 B2 * | 10/2007 | Chen et al. | 700/97 |
| 7,356,371 B2 * | 4/2008 | Dixon et al. | 700/28 |
| 7,389,302 B2 * | 6/2008 | Dietrich et al. | 1/1 |
| 7,831,419 B2 * | 11/2010 | Cariveau et al. | 703/7 |
| 2002/0082723 A1 * | 6/2002 | Flendrig et al. | 700/31 |
| 2003/0033127 A1 * | 2/2003 | Lett | 703/11 |
| 2007/0179638 A1 * | 8/2007 | Dreiling et al. | 700/29 |
| 2007/0260334 A1 * | 11/2007 | Pearson et al. | 700/29 |
| 2008/0208068 A1 * | 8/2008 | Robertson et al. | 600/508 |

* cited by examiner

*Primary Examiner* — Ronald Hartman, Jr.
(74) *Attorney, Agent, or Firm* — Anthony R. Lambert

(57) ABSTRACT

There is a method to model large electric power consuming facilities for power system studies. A general facility model, for example a template, is created for different types of industrial or commercial facilities. A template includes all necessary and general electric system information such as the common electric network configuration of a specific type of facilities. The template, stored in a database, is then scaled and adjusted based on the power demand level of the case-specific facility to be modeled based on facility specific parameters acquired for the facility. The result is a full, case-specific model of the facility to be modeled. The case-specific model is simplified into an equivalent model with varying details according to a user's specification. The results are the case-specific facility model of interest to the user. The model is normally included into the power system model of the utility network for power system simulation studies.

6 Claims, 15 Drawing Sheets

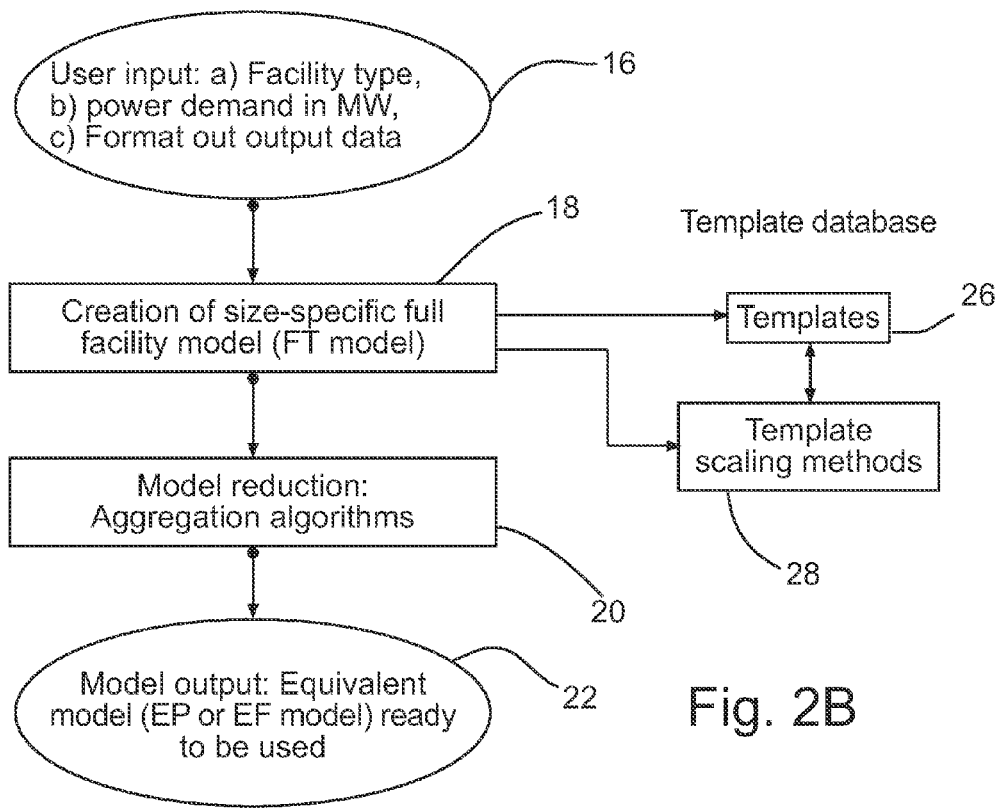
Fig. 2B
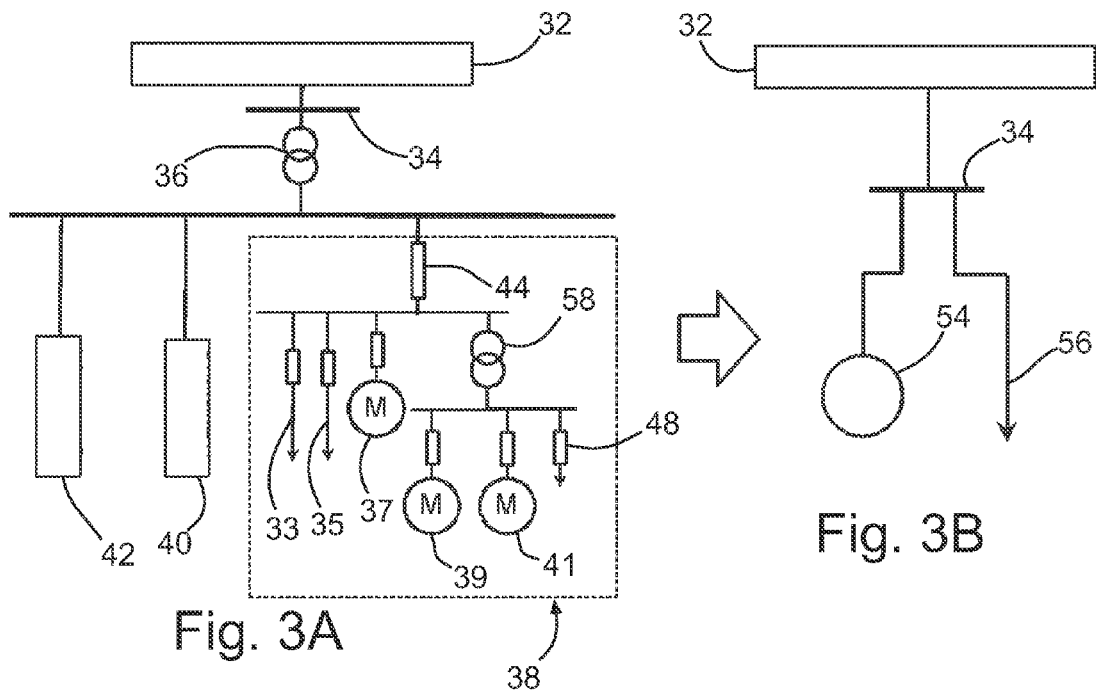
Fig. 3A
Fig. 3B

OPERATION AND CONSTRUCTION OF ELECTRIC POWER CONSUMING FACILITIES USING FACILITY MODELS

CROSS-REFERENCE TO RELATED APPLICATIONS

This application is a non-provisional of, and claims the benefit under 35 USC 119(e) of, U.S. provisional application Ser. No. 61/169,189, filed Apr. 14, 2009.

TECHNICAL FIELD

This document relates to modeling of power supply systems, for example modeling large power consuming facilities in power supply systems.

BACKGROUND

Large electric power consuming facilities such as oil refineries, steel mills and shopping complexes are major loads to a power transmission or distribution system. For computer-simulation based power system planning and operation studies, it is critical to model such loads properly due to their large power demands and complex responses to power disturbances. Inadequate models may result in a poorly designed power supply system or costly system investment decisions.

There is, however, a great challenge to establish adequate models for large facilities. For power system planning studies, basic information such as circuit diagrams, load composition and motor sizes etc. of the future industrial or commercial facilities are often not available. So it is extremely difficult to develop models of future facilities for long range planning studies. For power system operation studies, the facilities of concern have been built and are operating. But there are still difficulties to construct adequate models for them or ascertain the validity of the developed models due to confidentiality restrictions of the facilities and other constraints.

Modeling of electric loads for power system studies is of great interest to the power industry. Research has been directed on forecasting the growth of loads in a neighborhood, such as for example U.S. Pat. No. 6,865,450 (B2) and U.S. Pat. No. 6,577,962 (B1). Another type of frequently-reported work is how to estimate the responses of the loads, served by a substation, to the changes of substation supply voltages or currents. Some research has been conducted on how to represent a group of induction motors using an equivalent motor model. However, very limited progress was made on how to model major facilities.

For bulk power system studies, a load generally refers to the collective real and reactive power demand of various distribution feeders connected to a substation. Proper representation of the dynamic responses of such loads is very important for power system stability studies. Due to lack of adequate data, load is probably the most difficult component in a power system to model properly. As such, a lot of research has been conducted in the area of load model development. The most representative work can be classified as heading in two different directions. The first direction uses the information of load composition and associated component models to compute the load parameters. This approach is theoretically sound but has a number of implementation problems. For example, how do we classify the loads into different types that have similar voltage-dependent characteristics? What are the valid models for different load types and at different time and seasons? Such difficulties have led to the second direction of research—direct measurement of load parameters. These methods have to rely on voltage disturbances to be successful. Unfortunately, disturbances suitable for load parameter estimations are so few and irregular. The lack of representativeness of the estimated parameters has severely limited the use of the measurement-based methods.

Loads can be classified into two categories based on their ownerships. The first category can be called aggregate loads. These are the collective power demands of various loads owned by different utility customers and served by the same substation. Examples are the power distribution feeders connected to a substation. The load modeling research works reviewed earlier are mainly developed for aggregate loads. The second category is the large industrial (and sometimes commercial) facilities owned by one customer and supplied by a (often dedicated) substation. Examples of such loads are oil refineries, steel mills and large airports, which are called facility loads in this document. Such loads typically consume large amounts of power (e.g. >50 MW), have complex and unique responses to power system disturbances. Unfortunately, the load modeling methods developed for the first category has limited use to the facility loads.

Facility loads present major loads in a power system. It is critical to model them properly due to their large power demands and complex responses to system disturbances. A common situation encountered by utilities planners can be described as follows: a manufacturer contacts a utility company and plans to develop an X-type industrial facility in a particular location. The facility needs about Y-MW power and could be in service in several years. It is common that basic information of the future industrial facility such as single-line diagrams, load composition, loading factors etc. is not available. The utility, however, must include the model of the future facility in its planning study since the load can be hundreds of MWs. For power system operation studies, the facilities of concern have been built and are operating. But there are still difficulties to construct adequate models for them or ascertain the validity of the developed models due to confidentiality restrictions and other constraints.

Limited research efforts were reported to address this load modeling gap. Some attempts have been made to describe a method of creating equivalent models for industry facilities assuming the electric structure of the facility is known. In some cases, assumptions are made that an industrial load consists of about 76% small and large motors, and 24% static loads. A few utility companies have adopted very crude approaches such as the WECC modeling guide. This guide suggests that the system load can be modeled as 80% static loads and 20% induction motors. The load class mix includes residential, commercial, industrial and agricultural loads. If this approach is used, an oil refinery will have a similar response to that of a mining operation in power system dynamic studies. This is clearly not acceptable when more and more accurate models are being developed for aggregate loads.

There is a need for a systematic method to address the deficiencies in modeling facility loads.

SUMMARY

In one embodiment there is a method of operating or constructing a power system comprising acquiring facility specific parameters for a facility. A facility specific model is generated by modifying a general facility model using the facility specific parameters. A power system is operated based on the facility specific model.

In one embodiment there is a method to model large electric power consuming facilities for power system studies. The methodology and its embodiments involve the creation of templates for different types of industrial or commercial facilities. A template includes all necessary and general electric system information such as the common electric network configuration of a specific type of facilities. The template, stored in a database, is then scaled and adjusted based on the power demand level of the case-specific facility to be modeled. The result is a full, case-specific model of the facility to be modeled. The case-specific model is simplified into an equivalent model with varying details according to supplied specifications. The model is normally included into the power system model of the utility network for power system simulation studies.

In one embodiment there is a database-type software package. Using very limited inputs, such as the facility type and power demand, from its user, the software tool will be able to create a model, full or equivalent, of a facility suitable for various types of power system studies.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 2B is a flow diagram of an embodiment of a method of creating an electrical model for a facility;

FIG. 3A is a schematic drawing of an example of a full facility model;

FIG. 3B is a schematic drawing of an example of an equivalent model corresponding to the full facility model in FIG. 3A;

DETAILED DESCRIPTION

Figure 1:
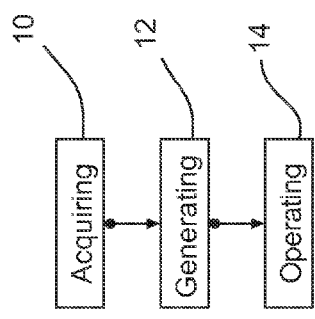
FIG. 1 is a flow diagram of a method of operating or constructing a power system.

FIG. 1 shows a method of operating or constructing a power system. At 10, facility specific parameters are acquired for a facility. At 12, a facility specific model is generated by modifying a general facility model using the facility specific parameters. At 14, a power system is operated based on the facility specific model.

The facility specific parameters may include an indication of facility-type of the facility, which may determine the general facility model selected to be modified. Modifying the general facility model may include scaling the general facility model using the facility specific parameters to create a scaled facility model and creating a simplified equivalence model from the scaled facility model to form the facility specific model. The facility specific parameters may also include predicted values or actual values of power demand for the facility. The general facility model may be scaled based on the predicted values or actual values of power demand for the facility. Modifying the general facility model may also include modifying the general facility model using the inputted facility specific parameters to create a modified facility model and generating a simplified equivalent model from the modified facility model to form the facility specific model. The stored general facility model may be derived from models of common configurations for various types of facilities. The general facility model may include, for example, process parameters, load parameters and network parameters. Scaling the general facility model may include scaling one or more of the process parameters, load parameters and network parameters using the facility specific parameters. Creating a simplified equivalence model may include calculating equivalence methods for the process parameters. The facility specific parameters may also be acquired by the system, for example, from a database or be provided from other sources, such as a user input or based on known information about a facility.

The method may be carried out on a computer system. The acquired facility specific parameters may, for example, be input into a system by a user. The user may also indicate the preferred detail of the facility specific model. The specific facility model may be a detailed model of the facility or may be an equivalence model which has increased simplicity for uses in large system simulations. The results are the case-specific facility model of interest to the user. The specific facility model may be sent from the computer system as an output in a format that is compatible with power system simulation studies. The facility specific model may be generated by the method shown in FIGS. 2A and 2B.

Once a facility specific model is generated, the information can be used to operate the power system 14 (FIG. 1). For example, after a utility company runs simulation studies, the results may show, for example, more accurate amount of loads that must be shed under contingencies and how fast the loads must be shed to avoid system collapse. The utility company may then adapt the setting of load shedding controllers (called load shedding relays). It may also improve the identification of load shedding locations. The simulation study may reveal that the system has more margin than originally thought, so some system reinforcement projects can be delayed.

Figure 2A:
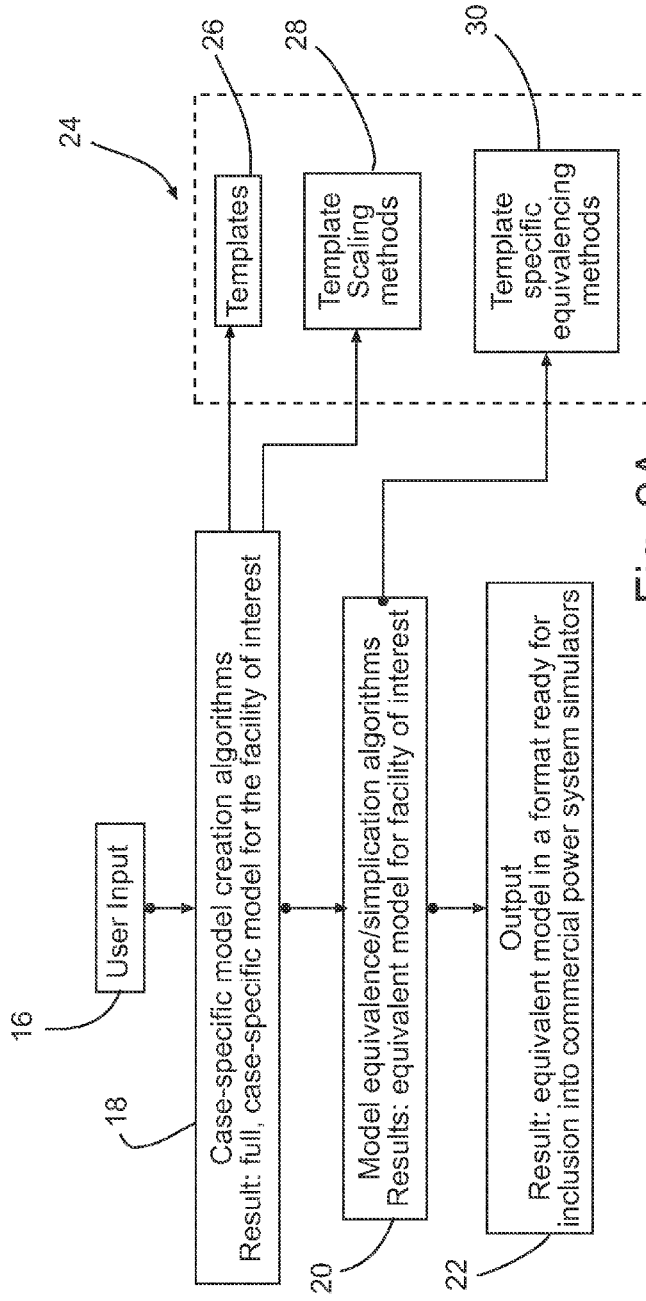
FIG. 2A is flow diagram of an embodiment of a method of creating an electrical model for a facility.

FIGS. 2A and 2B show a method of creating an electrical model for a facility. Facility specific parameters are provided by a user and input into the system at 16. A case specific model is created at 18 using information stored in a facility database 24. The facility database 24 consists of 3 main components: a) facility templates 26, 2) template scaling methods 28, and 3) template specific model simplification methods 30 (FIG. 2A).

A model equivalence algorithm is applied to the case-specific model at 20. The equivalence model is output from the system at 22 in a format ready for inclusion into commercial power system simulators.

In this embodiment, the user enters limited information to the software tool at 16. Typical data needed from the user may include, for example:

a) the power demand of the facility whose model is needed by the user. The power demand is normally expressed as nominal or rated MW of the facility.

b) the type of facility involved. The facility type refers to the kinds of manufacturing or commercial facilities per standard industry classification. For example, oil refineries, steel mills, coal mines, oil fields and shopping complexes are facility types.

c) the size of the final model to be output. The size is typically characterized as the number of electric nodes or buses included in the resulting model. An actual facility often includes several hundred nodes and it is desirable to have a model that has a much smaller size but has equivalent responses to power disturbances originated from the power supply system. Of course, the user may input more case-specific data so that the tool can generate more customized and accurate model.

A set of algorithms that create a full case-specific model for the facility entered by the user is shown at 18. The facility database 24, or template database, is used to create such a model. First, the database 24 is searched to extract the template representing the case-specific facility at 26. Second, the template is scaled or adjusted at 28 to match the power demand level entered by the user. Facility scaling refers to the process and techniques to modify the template circuits and loads automatically so that the scaled facility consumes approximately a specified amount of power. For example, if the standard template represents a 100 MW facility and a model of 75 MW facility of the same type is to be created, facility scaling will be used to achieve this goal. Facility scaling 28 is based on a set of scaling criteria and methods which are developed according to the manufacturing processes involved and the electricity demand characteristics of each process and contained as a component of template database 24. The resulting full case-specific model generally contains many detailed electric system information of the facility. A full model means it includes all key industry processes and loads within the facility. The model could contain hundreds of motor loads, multiple voltage levels and many circuit branches. The number of circuit nodes (or buses) of such a case specific model can be as high as 500 to 1000.

A set of algorithms that simplifies the full case-specific model into a smaller equivalent model is shown at 20. The case specific full model may not be suitable for power system studies if it is too big to be included into the model of the utility power system. The model of a utility power system covers vast geographical areas and includes many facilities serviced by the system. If each facility is modeled in detail, the total power system model can become too large to be useful. So it is desirable to include only the key electrical response characteristics of a facility using a simplified or equivalent model. This simplified model is created by the facility or model equivalence process. Model equivalence consists of a set of algorithms to reduce the size of the full model and yet preserves its key electrical response characteristics as seen from the perspective of the power supply system. The model equivalence will result in a much smaller model, say 2 to 30 buses, of the original facility. While the model equivalence work is provided at 20, some facility types may have specific model equivalence requirements and/or involve specialized equivalence technique. Such template specific features 28 are kept as a component of the facility database 24.

As an example, FIGS. 3A and 3B shows that a full case-specific model of a facility is simplified into an equivalent model that consists of an equivalent induction motor in parallel with an equivalent static load. FIG. 3A shows a utility power system 32 connected to a first bus 34 which is connected to a transformer 36. The model has a first process 38, a second process 40 and a third process 42. The first process 38 includes a cable 44, a transformer 58, and various motor loads 37, 39 and 41 and static loads 33, 35 and 48. To test the validity of the equivalent model, a three-phase short-circuit is applied at the system-facility interface point 34. FIG. 3B shows an equivalent (simplified) model which shows the utility power system connected to the first bus 34, which is connected to an equivalent motor model 54 and an equivalence static load 56. Simulations of active power swings of both the full and equivalent model have shown that there is a good agreement between the responses of the two models. In this case, we can conclude that the equivalent model is acceptable.

There are many types of loads and networks involved for different types of facilities. They all need to be modeled collectively using simplified models. Different loads and different networks may involve different model equivalence algorithms. Furthermore, the algorithms are dependent on the types of applications (e.g. power flow, short-circuit, stability simulation, etc) the model is intended for. What is important is the generic function of model equivalence and simplification. The actual algorithms for model reduction can vary with the facility types, load types and the desired degree of simplification.

In FIG. 2A, at 22 the simplified, case-specific facility model is output in a format that can be directly inserted into the power supply system models of commonly used commercial power system simulators. Based on the user supplied format information, the database tool will output the resulting equivalent model in a format that can be directly included into the power system simulator of the user without any editing work. The database tool may also output a comparison of the dynamic responses between the full template model and the equivalent model. The size of this output model is affected by the facility type and power demand, and the user desired modeling accuracy. A simplest model can be an equivalent induction motor model in parallel with a static load model. A more detailed model may include several equivalent motors and static loads connected in an equivalent network. The form and the nature of the model may differ for different types of power system study applications. The model reduction algorithms could be specific to a facility type depending on the complexity of the loads in the facility.

Among the three components of the proposed load modeling method, the creation of facility template and the method of template scaling are facility dependent. They are illustrated in an example set out in the following that specifically deals the modeling of oil refinery facilities. The model equivalence methods are generally applicable to many facility types.

The facility template 26 (FIG. 2A) refers to the most common electric system configuration of a facility type. The configuration includes but is not limited to industry processes and associated electric supply circuits, number of circuit branches and voltage levels, load types and load composition, common motor sizes for different processes, motor voltage levels, and types of distribution lines or cables etc. The facility templates are created mainly through a) facility design manuals and b) extracting common characteristics of sample facilities. Facilities of the same type share many common characteristics including the characteristics of their electric systems. Such characteristics are often documented in industry specific design codes or manuals so that the same facility can be mass designed and constructed by engineering companies with minimum effort. For example, design manuals and books are available for airports including their electric systems. Template electric systems can thus be created from these design manuals. Alternatively, one can examine existing facilities of the same type and extract their common characteristics. The sample facilities can be collected from published technical literature or from the facility owners.

One of the key features of the facility template is the production processes that need to be powered by the facility electric system. Many facilities are constructed according to their production processes and there are usually several processes involved in one facility. Each process is generally powered by one or more dedicated circuits. The circuits of various processes form the entire electric system of a facility. Of interest to power system studies are the electric load characteristics of such processes and their operating characteristics. The electric load characteristics here refer to the type of loads as seen from the perspective of electric engineers. The load can be motor loads, heating loads or others. The operating characteristics refer to the operating cycles of the processes. The processes may operate 24 hour a day or may shutdown outside normal office hour. The process may draw power in steady-state fashion or in a pulse-like manner. Including such characteristics in the facility template will enable the method to generate various models of the same facility to meet different power system study needs. One type of facilities may involve several templates. For example, one type of refinery facility may have self-generation capability while the other type of refinery may not.

Figure 4:
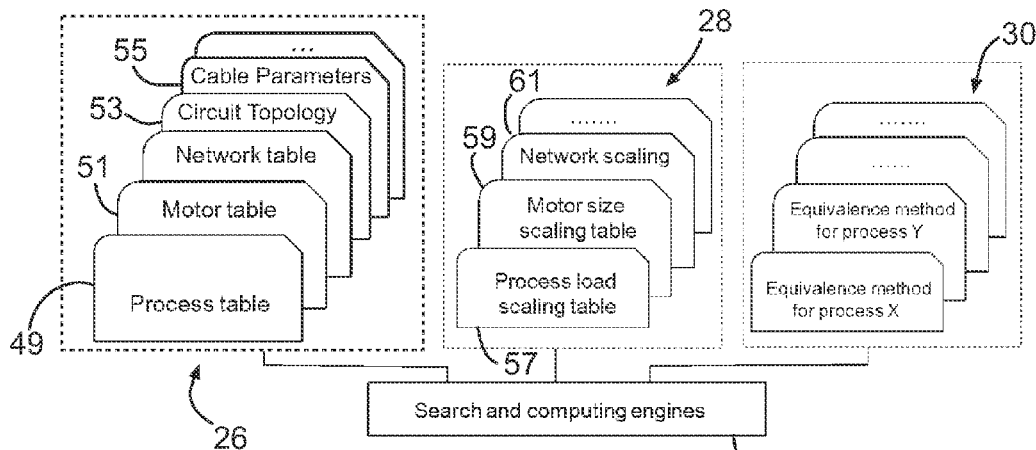
FIG. 4 is a flow diagram of various templates stored in a database.

Each template 26 (FIG. 2A) is stored in the database in the form of data tables as shown in FIG. 4. Some examples of potential tables may include the following. A first table 49 may contain the names of the production processes and their power demand levels. A second table 51 may contain the sizes and electrical parameters of the motors commonly seen in a particular process. A third table 53 may contain the circuit topology of the facility and its processes. A fourth table 55 may contain the length and impedance parameters of the cables supplying loads in a process. Various other tables may be used that provide information that would be useful for creating an electrical model of the facility. In summary, a template of a facility contains all the data needed to create an electrical model for the facility. A search and computing engine 50 may store and process information stored in the database.

The facility scaling methods 28 refer to the methods of modifying the template circuits and loads automatically so that the power consumption level of the modified template facility is equal to the user specified value. Facility scaling methods are based on the understanding of the production processes involved. The scaling is based on a set of scaling criteria that are developed according to the manufacturing processes involved for that type of facility and the electricity demand characteristics of each process. Many processes generally consume electricity in proportion to the total facility power demand. On the other hand, the lengths of the electric power distribution circuits involved may not change proportionally with the power consumption level. So the scaling methods further include a database that represents the relationships between the total facility power demand and the characteristics of each industry processes in the facility. The facility scaling methods are also affected by the types of facilities and the intended applications of the eventual facility model. Therefore, there is a collection of scaling data and methods specific for each type of facilities as shown at 28. Scaling information may be specific to, for example, process load scaling 57, motor size scaling 59 or network scaling 61, among other types of scaling information.

Template specific equivalence methods 30 (FIG. 2A) refer to the methods of reducing the full case-specific facility model to an acceptable size. Different from the generic model equivalence algorithms contained in 20 (FIG. 2A), these equivalence methods are unique to the types of facility involved. The purpose of including such methods for some types of facilities is to improve the accuracy of model equivalence since facility-tailored equivalence methods instead of generic equivalence methods are used. The second purpose is to address the cases where generic model equivalence methods cannot be used due to the complexity of the loads to be aggregated. The case-specific model created through template scaling process often contains hundreds of buses and motors. Such a big-sized load model is not suitable for power system studies. The model of a utility power system covers vast geographical areas and includes many industrial facilities serviced by the network. If each industrial facility is modeled in detail, the total power system model could become too large to be useful. So it is desirable to include only the key electrical response characteristics of an industrial facility using an equivalent model. The equivalent models are constructed by aggregating/reducing the full template model. The methods of aggregation can be facility dependent, process dependent or both facility and process dependent.

Once a full template model for a facility is created, it is essential to reduce the model that may contain several hundred buses and motors to a smaller equivalent system. The electric systems of the majority of industrial facilities have radial (tree) configurations as illustrated in FIG. 3A. At the tips of the system are multiple motors (or other types of loads) connected to the same buses. Several such branches are often connected to a higher voltage bus through transformers and cables/lines. This group of branches forms the power supply for one of the production processes of the facility. Industrial facilities are constructed according to their production processes and there are usually several processes involved in one facility. If all the loads in one process are reduced into one equivalent load, this will lead to an equivalent facility model that has each of its processes represented as one equivalent loads. This model is called Equivalent Process (EP) model as described at 20 (FIG. 2A). In the next steps, several processes or all processes can be aggregated into one load, which leads to the simplest equivalent model of the facility under study.

One embodiment of the equivalence process is presented in the following five steps:

Step 1: Equivalence of Static Loads

A very simple method is adopted to deal with the static loads: the rated MW of the static loads for each individual process is added up together to derive the lumped static loads of the whole facility as follows:

$$Z = \frac{S}{V^2} = \frac{P}{V^2 \times (\text{Power Factor})} \quad (1)$$

where, P is active power, V is Line-to-line voltage, and S is apparent power. The lumped static load modeled as a constant impedance (Z) load is connected to utility-customer interface bus. It is possible that more delicate methods to equivalent static loads can be developed.

Step 2: Equivalence of Induction Motors at the Same Bus

After taking out static loads from each process, induction motors (and synchronous motors) are the loads left in the feeders. At each bus, there may be several induction motors connected. These induction motors can be aggregated into one equivalent motor. One method described by the reference D. C. Franklin and A. Morelato, "Improving Dynamic Aggregation of Induction Motor Models", IEEE Transactions on Power Systems, Vol. 9, No. 4, November 1994, Page(s): 1934-1941 is adopted. The main steps are summarized below:

1) Calculate the equivalent circuit parameters for the aggregated induction motor. 2) Determine initial slip and the power absorbed for each individual induction motor. 3) Calculate initial slip and the power absorbed for the aggregated induction motor. 4) Calculate the mechanical load characteristic curve for the aggregated induction motor by changing the rotor resistance $R_2$ of each individual induction motor. 5) Calculate inertia of the aggregated induction motor based on the given inertia of individual induction motors. 6) The branch impedance of the upstream circuit of the aggregated induction motor such as transformers and cables/lines is added to the stator impedance of the aggregated induction motor.

Figure 5:
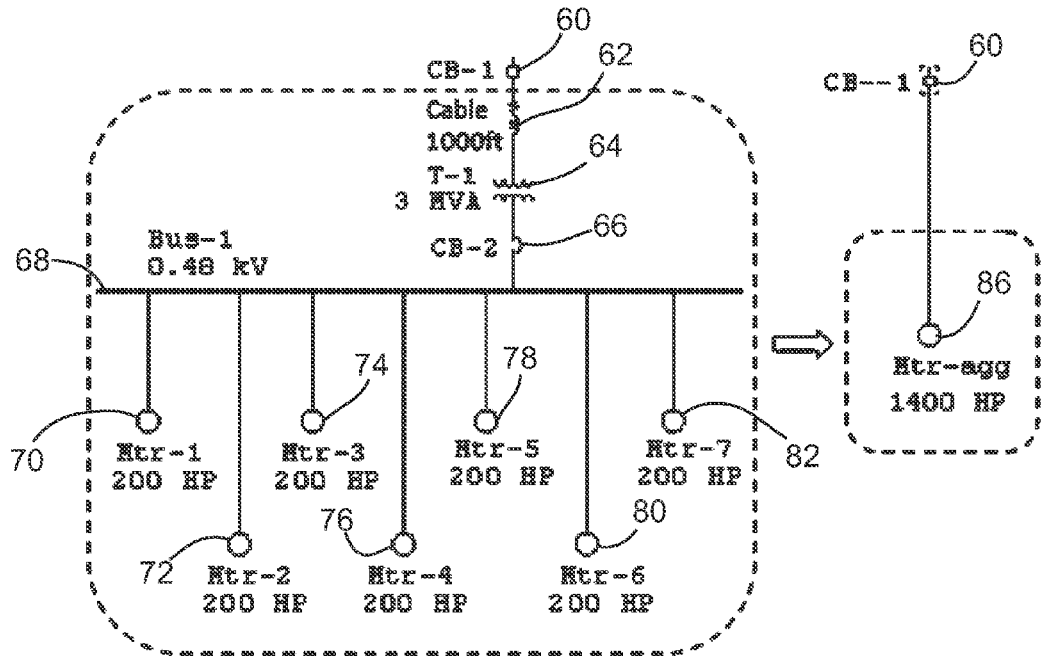
FIG. 5 is a schematic drawing of a group of induction motors connected to the same bus.

FIG. 5 shows a group of 200 HP induction motors 70, 72, 74, 76, 78, 80, 82 connected to a single bus, 68, with an upstream transformer 64 and cable 62 between a first and second circuit breakers 60, 66. The induction motors 70, 72, 74, 76, 78, 80, 82 and its upstream branch circuit can be aggregated into a single 1400 HP equivalent induction motor, 86, using the method discussed in this step.

Step 3: Equivalence of Synchronous Motors at the Same Bus

When several synchronous motors are connected to the same bus, the parameters of the aggregated equivalent synchronous motor can be calculated as follows and more details can be found, for example, in R. Nath, and S. S. Lamba, "Development of Coherency-based Time-domain Equivalent Model Using Structure Constraints", IEE Proceedings, Vol. 133, Pl. C, No. 4, May 1986, pp. 165-175:

1) Determine the sub-transient reactance, transient reactance and synchronous reactance of the equivalent synchronous motor based on the reactance values of each individual synchronous motor connected to the same bus. 2) Calculate the inertia of the equivalent synchronous motor based on the inertia of each individual synchronous motor. 3) Calculate the rated KW/HP of the equivalent synchronous motor based on the rated KW/HP of each individual synchronous motor. 4) Calculate the time constants of the equivalent synchronous motor based on the time constants and inertia of each individual synchronous motor and the inertia of the equivalent synchronous motor calculated in 2).

The classical synchronous machine two-axis model is used to represent synchronous motors. The two-axis model has one field winding in the direct axis and one damper winding in the quadrature axis.

Step 4: Equivalence of an Industry Process

An industry process may contain multiple buses at different voltage levels. If there are no synchronous motors in the process, the induction motors can be aggregated using a bottom up approach through the method described in Step 2. This aggregation approach will eventually reduce the network of the process into one equivalent induction motor.

If there are synchronous motors involved, the network aggregation is much more complex. Synchronous generator aggregation techniques are adopted for synchronous motor aggregation (i.e. no inclusion of excitation system, turbine-governor system and power system stabilizer).

The overall procedure of the facility equivalence involving synchronous motors can be described as follows: 1) Identification of groups of coherent synchronous motors. It is assumed that all synchronous motors that are aggregated are coherent. This assumption is typically verified to be valid in the practice, since the intervention of modern protection is fast enough (three or four periods of the fundamental frequency) to avoid the loss of synchronism of synchronous machines. 2) Network reduction. The terminal buses of each coherent group of synchronous motors can be replaced by a single equivalent bus. 3) Dynamic aggregation of synchronous motors. Each coherent group of synchronous motors connected to the single equivalent bus can be combined into one equivalent synchronous motor using the calculation method discussed in Step 3.

Figure 6:
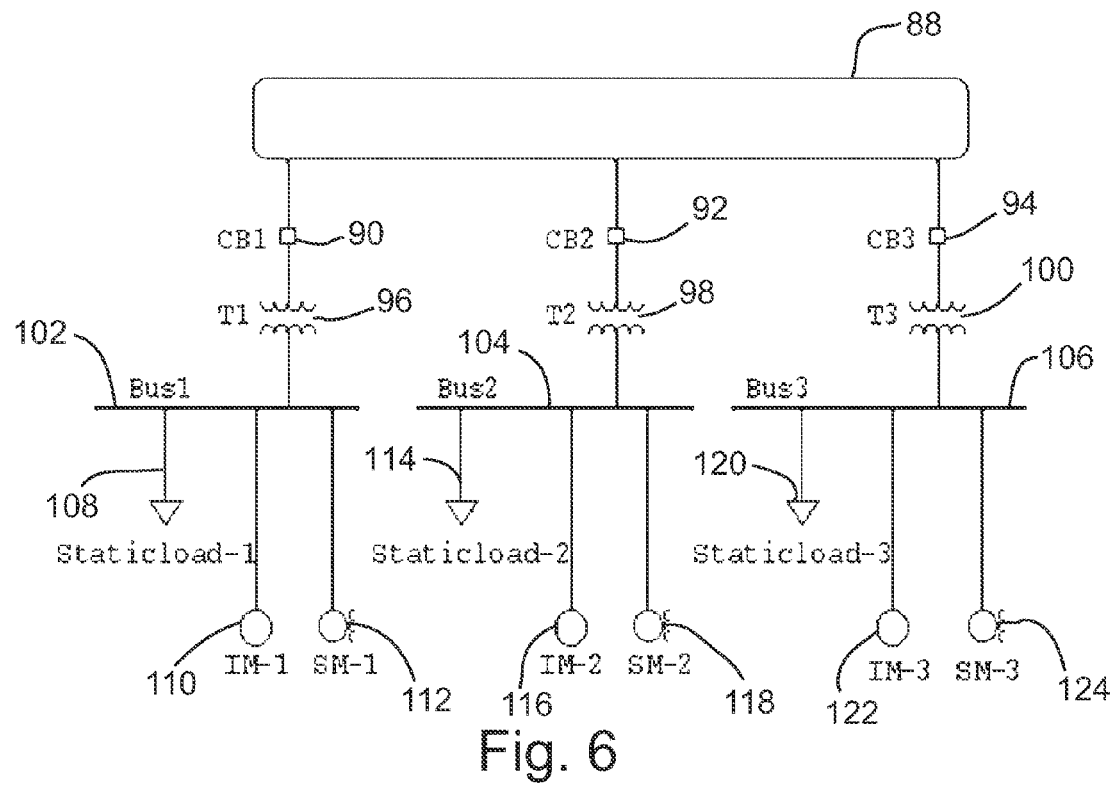
FIG. 6 is a schematic drawing of a sample network with various loads.
Figure 7:
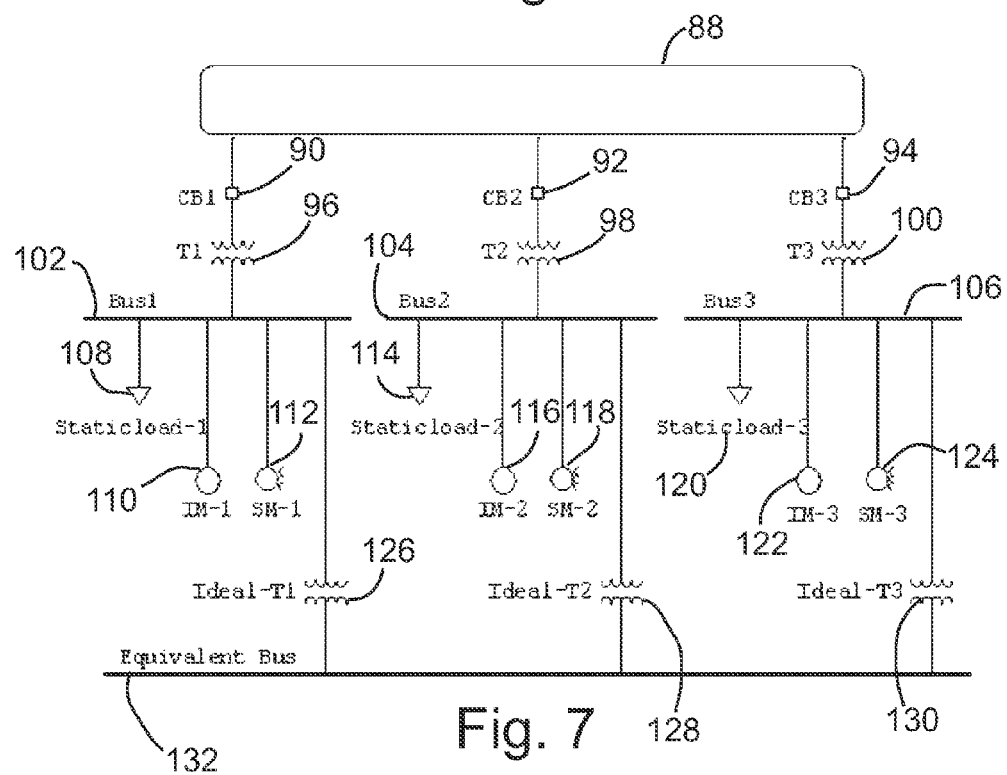
FIG. 7 is a schematic drawing of an equivalent model to the network shown in FIG. 6.

An example of this facility equivalence method is shown in FIGS. 6-9 using a sample network shown in FIG. 6. The remainder of an original network is denoted by 88. The network 88 is connected to three buses 102, 104, 106. The first bus 102 is connected to the network 88 through a circuit breaker 90 and a transformer 96, and is connected to a static load 108, an induction motor 110 and a synchronous motor 112. Similarly, the second bus 104 is connected to the network 88 through a circuit breaker 92 and a transformer 98, and is connected to a static load 114, an induction motor 116 and a synchronous motor 118. Similarly, the third bus 106 is connected to the network 88 through a circuit breaker 94 and a transformer 100, and is connected to a static load 120, an induction motor 122 and a synchronous motor 124. The terminal voltage $V_t$ on the equivalent bus is defined as either an average voltage of the group (first bus 102, second bus 104 and third bus 106) or the voltage of an individual bus. Each individual bus 102, 104, and 106 is connected to an equivalent bus 132 (FIG. 7) through an ideal transformer 126, 128, 130, respectively, each ideal transformer with a complex turn ratio. The turn ratio $a_k$ for the kth ideal transformer is determined as follows:

$$a_k = \frac{V_k}{V_t} \quad (2)$$

where, $V_k$—voltage on Bus k (k=1, 2, 3, ... n) and $V_t$—voltage on the equivalent bus. Under coherent conditions, the ratio $a_k$ is constant for each bus in the group and no circulating power flows through any of the phase shifter.

Figure 8:
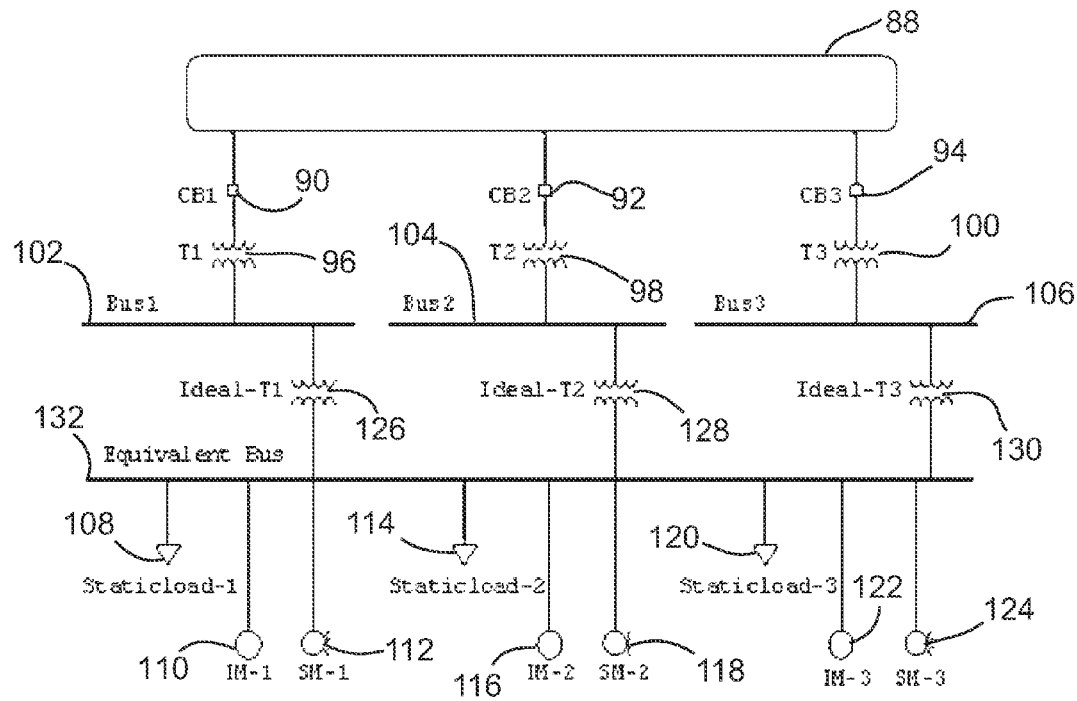
FIG. 8 is a schematic drawing of an equivalent model to the network shown in FIG. 7 after a load transfer.

As shown in FIG. 8, the induction motors 110, 116, 122, synchronous motors 112, 118, 124 and static loads 108, 114, 120 on the coherent buses 102, 104, 106 are transferred to the equivalent bus 132. The motors are not modified by the transfer, but static loads, which are modeled as shunt admittance, should be scaled to account for the off-nominal tap-ratio of the ideal transformer. The load transfer can be illustrated by FIG. 8.

Figure 9:
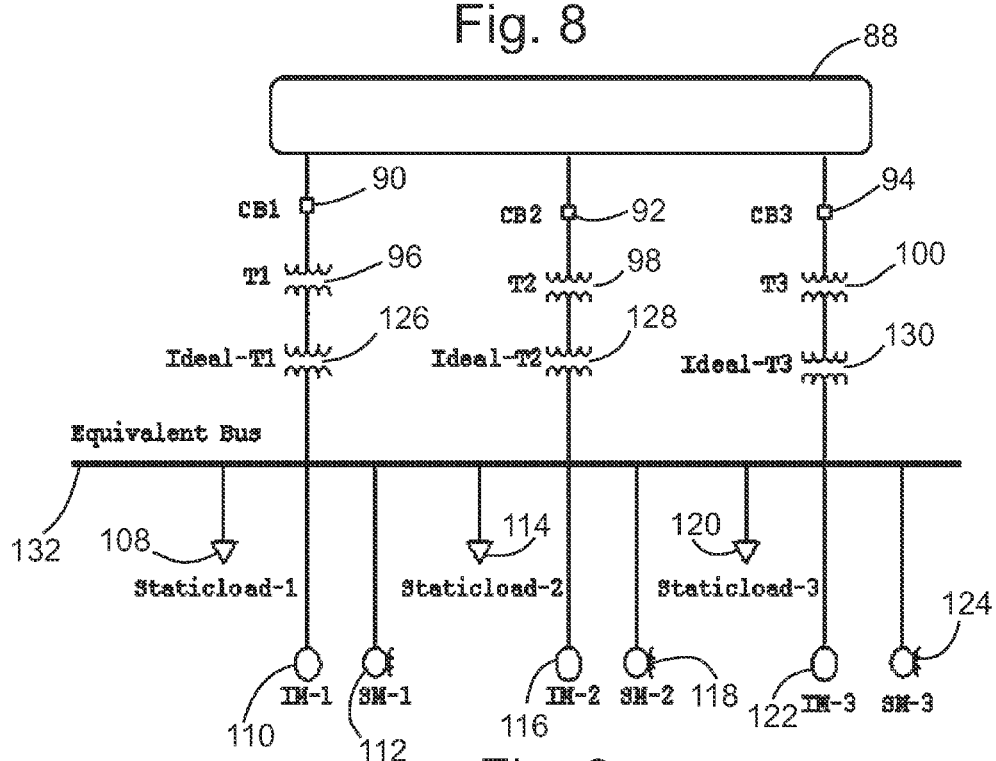
FIG. 9 is a schematic drawing of an equivalent model to the network shown in FIG. 8 where the original coherent buses are eliminated.

The original coherent buses are eliminated by series combination of the original branch and the ideal transformers as shown in FIG. 9. The bus reduction procedure only affects those branches which are connected in the coherent group with synchronous motors.

Figure 10:
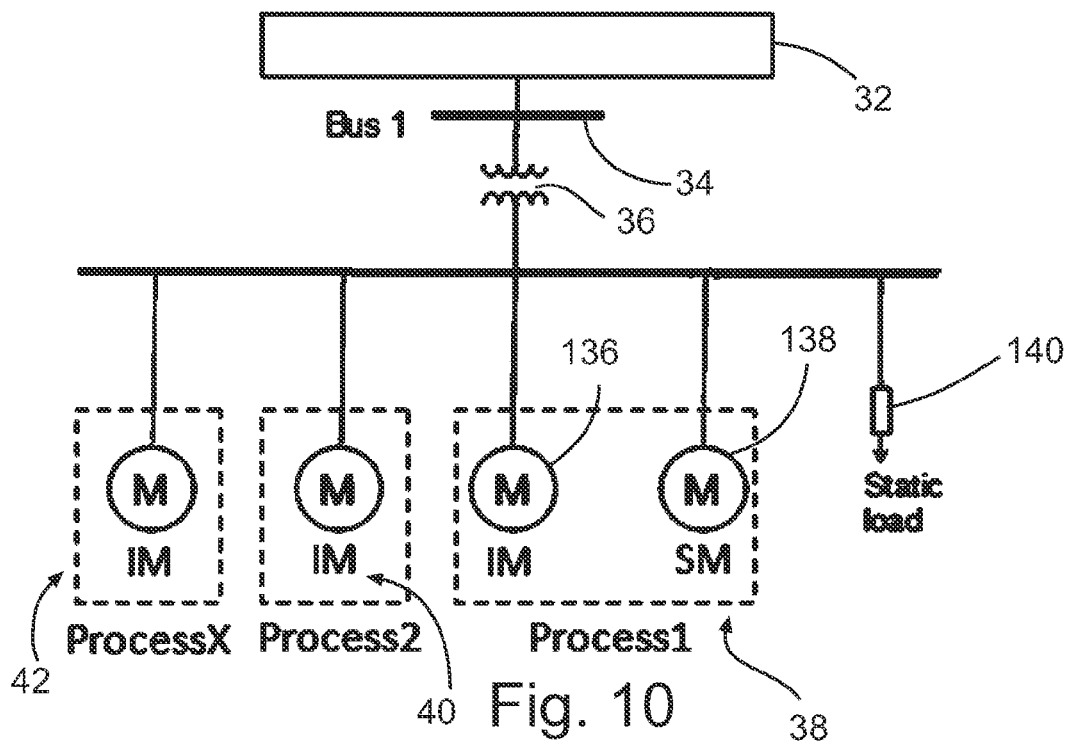
FIG. 10 is a schematic drawing of the resulting equivalence process model that corresponds to the network shown in FIG. 3A.

This procedure is repeated for each of the industry process during the facility equivalence. The resulting model is called Equivalent Process (EP) model with an equivalent induction motor and an equivalent synchronous motor (if synchronous motors are actually present in the process) representing loads in each process. The EP model for the facility shown in FIG. 3A is provided in FIG. 10. FIG. 10 shows the utility power supply system 32 connected to bus 34 and transformer 36. Processes 38, 40 and 42 are shown connected to the transformer 36 and a static load 140. Within each of the processes 38, 40, and 42 the motors are separated into induction motors and synchronous motors, so that in the first process 38, there is an induction motor 136 and a synchronous motor 138.

Step 5: Equivalence of Entire Facility

Figure 11:
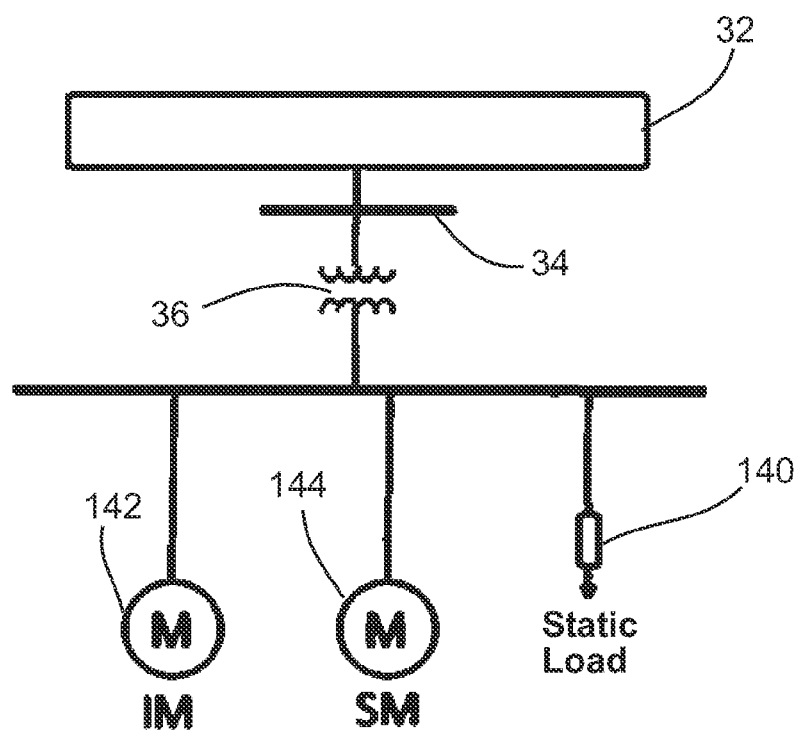
FIG. 11 is a schematic drawing of a equivalence facility model corresponding to the network shown in FIG. 3A.

Models of all processes can be aggregated into one model called the "Equivalent Facility (EF) model". This model has one induction motor 142, one synchronous motor 144 and the one lumped static load 140 as shown in FIG. 11.

Figure 12:
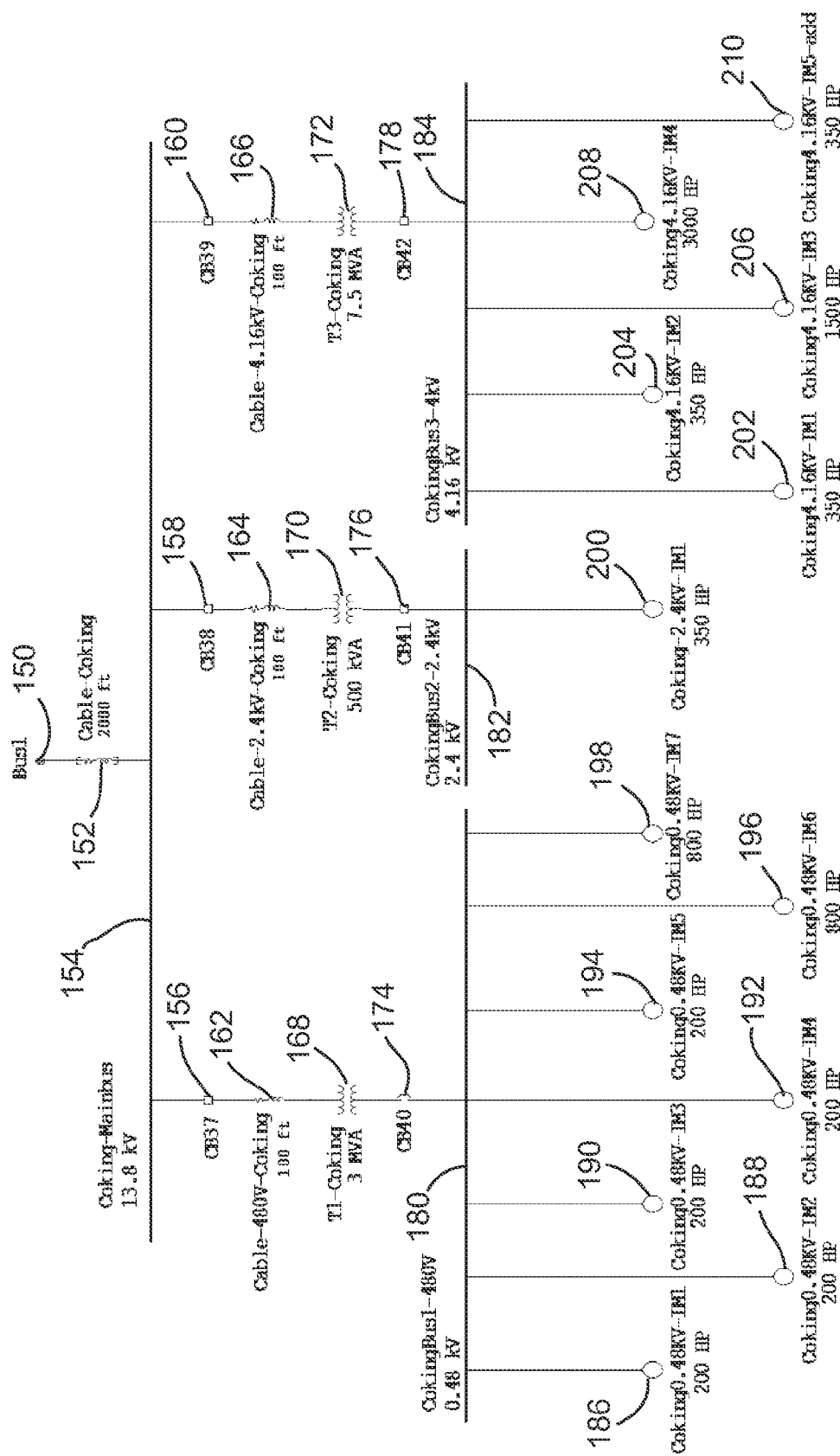
FIG. 12 is a schematic drawing of an electrical single-line diagram of an oil refinery facility.
Figure 13:
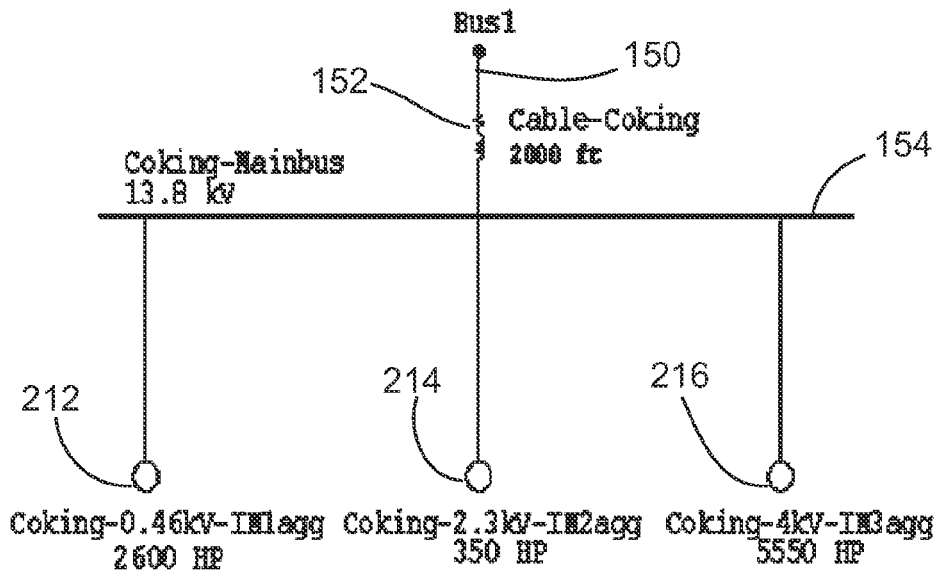
FIG. 13 is a schematic drawing of a model of the system in FIG. 12 with three equivalent induction motors.
Figure 14:
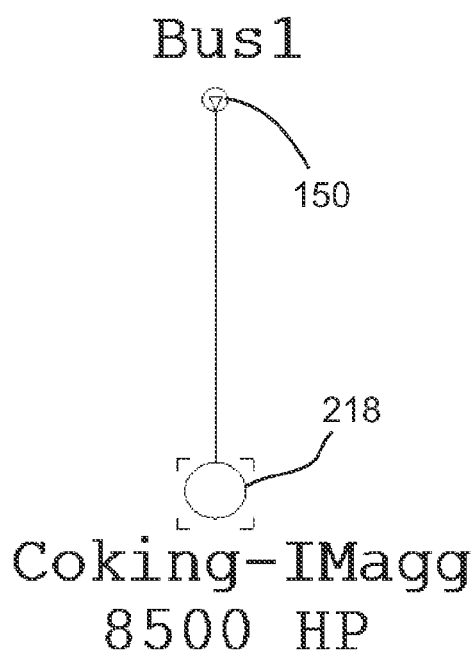
FIG. 14 is a schematic drawing of a model of the system in FIG. 12 with one equivalent induction motor.

As an example, an industry process in an oil refinery facility is to be reduced into an equivalent model as shown in FIGS. 12-14. The single-line diagram of the coking process is shown in FIG. 12. A bus 150 is connected by a 2000 ft main cable 152, to a mainbus 154. The mainbus 154 is connected to a first bus 180 through circuit breaker 156, a 100 ft 480V cable 162, a 3 MVA transformer 168, and circuit breaker 174. The first bus 180 is connected to seven induction motors: five 0.48 kV 200 HP induction motors 186, 188, 190, 192 and 194, and two 0.48 kV 800 HP induction motors 196 and 198. The mainbus 154 is connected to a second bus 182 through circuit breaker 158, a 100 foot 2.4 kV cable 164, a 500 kVA transformer 170 and circuit breaker 176. The second bus 182 is connected to a 2.4 kV 350 HP induction motor 200. The mainbus 154 is connected to a third bus 184 through circuit breaker 160, a 100 foot 4.16 kV cable 166, a 7.5 MVA transformer 172 and circuit breaker 178. The third bus 184 is connected to five induction motors: a 4.16 kV 350 HP induction motor 202, a 4.16 kV 350 HP induction motor 204, a 4.16 kV 1500 HP induction motor 206, a 4.16 kV 3000 HP induction motor 208 and a 4.16 kV 350 HP induction motor 210. There are three different voltage levels for induction motors in this process. The voltage levels are 0.46 kV, 2.3 kV and 4 kV.

In FIG. 13, three equivalent induction motors 212, 214, and 216 are obtained by applying the induction motor aggregation technique to the electrical circuit at each voltage level. 1) Equivalent induction motor 212 is an equivalent 2600 HP 13.8 kV induction motor which represents the 0.46 kV motors group containing the seven induction motors 186, 188, 190, 192, 194, 196 and 198 in the Coking process. The impedance of the transformer 168 and the 100 ft cable 162 are included in the equivalent motor. 2) Equivalent induction motor 214 is an equivalent 350 HP 13.8 kV induction motor represents the 2.3 kV motors group containing induction motor 200. Although the 2.3 kV single induction motor does not need aggregation with other motors in this case study, but the impedance of the transformer 170 and the 100 ft cable 164 at the motor's upstream circuit are added to the stator impedance of the motor to include their influence. 3) Equivalent induction motor 216 is an equivalent 5550 HP 13.8 kV induction motor represents the 4 kV motors group with five induction motors 202, 204, 206, 208 and 210 in the Coking process. The branch impedance for the transformer 172 and the 100 ft cable 166 are included in the equivalent motor model.

The three equivalent induction motors shown in FIG. 13 are further grouped into a new equivalent induction motor using the same aggregation algorithm. The impedance of the 2000 ft main cable 152 is added to the stator impedance of the new equivalent motor. The whole Coking process now becomes an 8500 HP equivalent induction motor 218 as shown in FIG. 14.

The dynamic responses of the process before and after aggregation are compared for the event of a main circuit breaker switching. The simulation was done by ETAP. The circuit breaker is open at 1.00 second and close at 1.08 second, the total simulation time is 5 seconds. The MW and MVAR response at the main transformer connected to bus 150 for the original system (FIG. 12) and the equivalent system (FIG. 14) show good agreements for the original and equivalent systems, which verifies that the induction motors aggregation technique used in the facility equivalent process is accurate.

Oil Refinery Example

An example of the template modeling applied to oil refinery facilities is given here. The results of the established templates and their scaling methods are discussed in the following.

Using a 108 MW coking refinery facility as a case study, a full template model (FT) is then created for this specific sample facility. The full template model is then converted to its two equivalent models, the equivalent process (EP) model and the equivalent facility (EF) model. In order to demonstrate the advantages of the proposed template models over the current utility practice for modeling industrial facilities, the guideline method, dynamic responses of the three template models (FT, EP and EF) are compared with the guideline model for the sample facility.

Templates and Their Scaling Methods for Oil Refinery Facilities

In order to establish templates for oil refinery facilities, two resources are mainly used: the extensive literature review and a practical oil refinery facility.

The main purpose of the templates for the template modeling approach is to capture the key characteristics of certain type of industrial facilities when very limited information is available. The templates include typical circuit diagrams, electric network configurations, motor sizes, load types and load compositions etc. Although a lot of information available for refinery facilities, only common characteristics found in general refinery facilities can be used to represent a template. The extensive research indicates that the industrial processes serve the best in this role.

Figure 15:
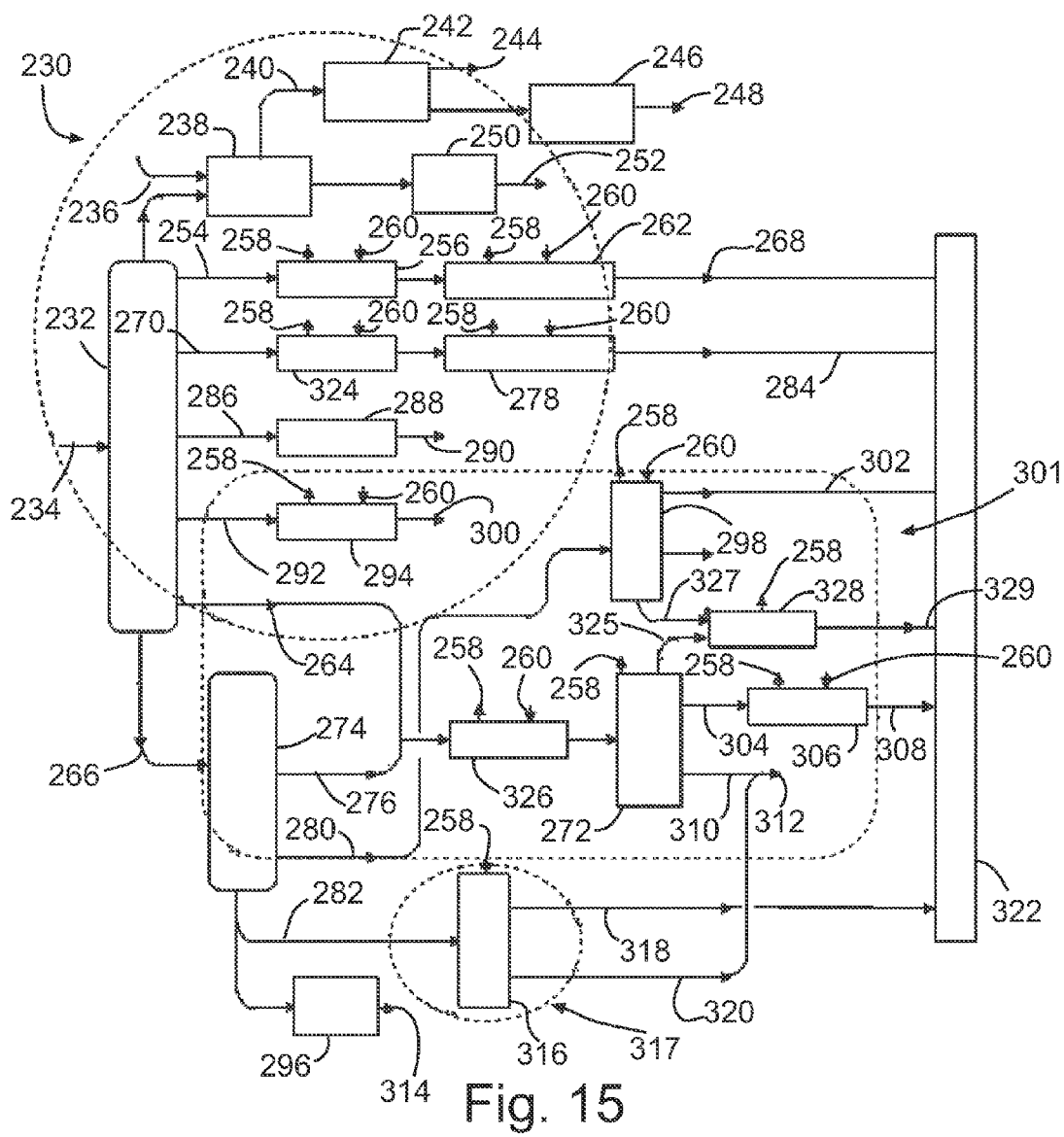
FIG. 15 is a schematic drawing of a typical oil coking refinery.

The study indicates that there are the following three general categories for the oil refinery facilities. The schematic flow chart for typical oil coking refinery facilities is shown in FIG. 15. The components of the facility include: a topping refinery 230, which includes an atmospheric crude distillation unit 232, a source of crude oil 234, a gas source 236, a gas processor 238, a line for fuel gas 240, amine treater 242, an output of refinery fuel 244, a sulfur plant 246, an output of sulfur 248, a merox treater 250, an LPG and butane output 252, a line for light naphtha 254 and a hydrotreater 256 having an output for gas 258 and an H$_2$ input 260 (each separate output for gas and input for H$_2$ are denoted by 258 and 260), an isomerization plant 262, an atmosphere gas oil line 264, an atmospheric bottom line 266, an isomerate line 268, a heavy naphtha line 270, a hydrotreater 324, a catalytic reformer 278, a fluid catalytic cracker 272, a vacuum distillation unit 274, a light vacuum gas oil line 276, a hydrotreater 326, a middle vacuum gas oil line 280, a vacuum residuum line 282, a reformate line 284, a jet fuel/kerosene line 286, a merox treater 288, a jet fuel/kerosene output 290, a diesel oil line 292, a hyrdotreater 294, an asphalt blower 296, a hydrocracker 298, a diesel oil output 300, a hydrocracked gasoline line 302, a naphtha line 304, a hydrotreater 306, a FCC Gasoline line 308, a FCC gas oil line 310, a fuel oil output 312, an asphalt output 314, a delayed coker 316, a coker naphtha line 318, a coker gas oil line 320, a gasoline blending pool 322, a butenes and pentenes line 325, an i-Butane line 327, an alkylation processor 328, and an alkylate line 329.

1). Topping refinery 230. This refinery separates the crude oil into its constituent products by Atmospheric Distillation unit (ADU). It consists only of the Atmospheric distillation unit 232 and probably the catalytic reformer 278 to provide octane. Typically only condensates or light sweet crude would be processed at this type of facility unless markets for heavy fuel oil (HFO) are readily and economically available. Asphalt plants are topping refineries that run heavy crude oil because they are only interested in producing asphalt.

2). Cracking refinery 301. This refinery is equipped with Vacuum Distillation Unit (VDU) 274 and the catalytic cracker 272 in addition to equipment in a topping refinery. The cracking refinery reduces fuel oil by conversion to light distillates and middle distillates. It takes the gas oil portion from the VDU (a stream heavier than diesel fuel, but lighter than HFO) and breaks it down further into gasoline and distillate components using catalysts, high temperature and/or pressure.

3). Coking refinery 317. This refinery processes Vacuum residual fuel 282, the heaviest material from the Vacuum Distillation Unit 274 and thermally cracks it into lighter product using a delayed coking process with the delayed coker 316. The coking refinery adds more complexity to the cracking refinery.

Topping refinery plants are not common type of refinery facilities, only a small number of topping plants are found in Canada. Primary refinery facilities are generally cracking refineries in Canada. Therefore, only cracking refinery facilities and coking refinery facilities are considered for constructing models.

Compared to Canadian refinery facilities, the US refineries are configured to process a large percentage of heavy, high sulphur crude and to produce large quantities of gasoline, and low amounts of heavy fuel oil. U.S. refiners have invested in more complex refinery configurations, which allow them to use cheaper feedstock and have a higher processing capability. Canada's refineries do not have the high conversion capability of the US refineries, because, on average, they process a lighter, sweeter crude slate. Canadian refineries also face a higher distillate demand, as a percent of crude, than those found in the U.S. so gasoline yields are not as high as those in the US, but are still significantly higher than European yields.

Research has been conducted on refineries to determine electricity consumption for each process. Electrical consumption for each process can be provided based on estimated 2001 energy balance for the U.S. petroleum refining industry. Electrical consumptions for an individual refinery, however, will be different due to different process configurations. Estimate of energy use in Californian refineries for 2001 has been found in previous work in the area. The estimate is based on a combination of data from different sources and assumptions on process throughput and process energy intensities. The three process units that consume the most electricity are the catalytic hydrocracker 298, alkylation unit 328 and coker 258 in this case. Published data for the U.S. petroleum refining industry and total electricity demand in a hypothetical California refinery are summarized in Table I.

An existing Canadian coking refinery facility is investigated for this category. Detailed single-line diagrams of the facility are used in the study. Electricity consumption for the existing Canadian coking refinery facility is also summarized in Table I for comparison purpose.

TABLE I

| Petroleum refinery process | U.S. Refineries | California Refineries | Hypothetical California Refinery | A Canadian Coking Refinery |
|---|---|---|---|---|
| Desalter | 0.561 | 0.451 | — | — |
| CDU (Crude Distillation Unit) | 7.625 | 4.539 | 6.827 | 2.68 |
| VDU (Vacuum Distillation Unit) | 1.785 | 1.861 | 2.289 | 9.86 |
| Hydrotreater | 33.395 | 18.072 | 17.884 | 2.14 |
| Coking | 9.772 | 7.697 | 18.028 | 8.57 |
| FCC (Fluid Catalytic Cracker) | 14.803 | 11.094 | 4.413 | 2.97 |
| Hydrocracker | 12.396 | 25.289 | 32.731 | 30.02 |
| Reforming | 7.210 | 5.498 | 2.778 | 0.67 |
| Deasphalting | 0.451 | 0.423 | 0.656 | — |
| Alkylates | 5.852 | 3.186 | 11.785 | 1.26 |
| Aromatics | 0.615 | 0.014 | 0.008 | — |
| Asphalt | 1.563 | 0.874 | 0.733 | — |
| Isomers | 0.841 | 0.733 | 0.630 | 5.97 |
| Lubes | 2.632 | 2.270 | 0.17 | — |
| Sulfur | 0.229 | 0.226 | 1.052 | 2.30 |
| Hydrogen | 0.189 | 4.412 | — | 3.60 |
| Gas Plant | — | — | — | 3.09 |
| Other | 0.081 | 13.361 | 0.016 | 26.87 |
| Total process use | 100 | 100 | 100 | 100 |

Due to significant difference on sulfur content on crude oil processed in U.S. and Canadian refinery facilities, modeling of refinery facilities are divided into four types: 1). Cracking Refinery processing high sulphur content; 2). Cracking Refinery processing low sulphur content; 3). Coking Refinery processing high sulphur content; and 4). Coking Refinery processing low sulphur content.

The electricity consumptions for two types of cracking refinery facilities and two types of coking refinery facilities used to construct the template models are summarized in Tables II and III, respectively. Cracking refinery in Table II is considered to be the coking refinery with the coking process removed. Tables III for coking refinery facilities are based on data provided in Table I.

Figure 16:
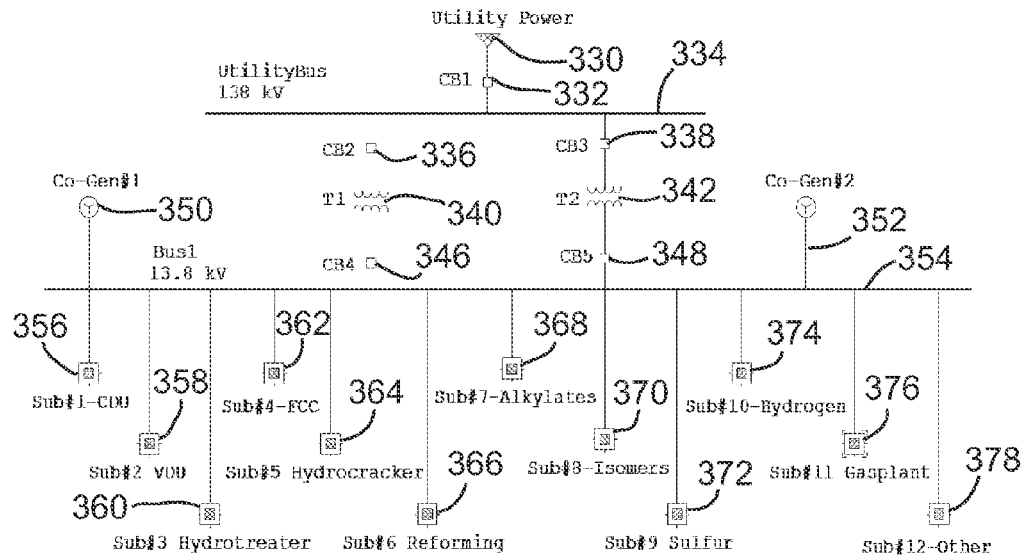
FIG. 16 is a schematic drawing of an example template single-line diagram for all Cracking refinery facilities processing high and low sulphur content.
Figure 17:
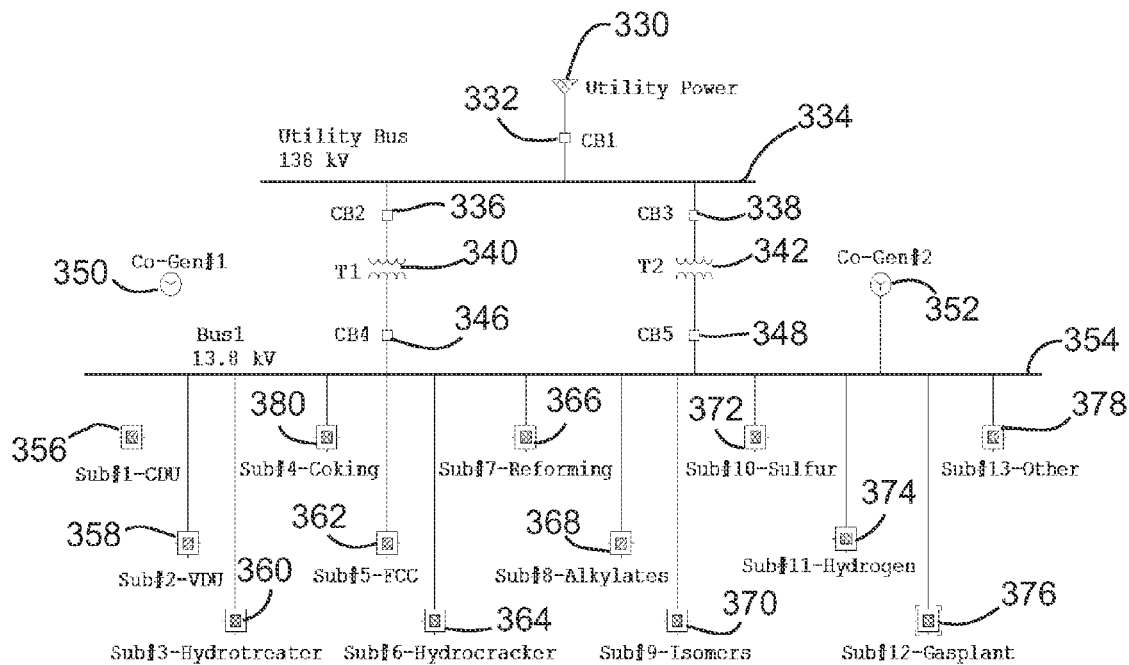
FIG. 17 is a schematic drawing of an example template single-line diagram for all Coking refinery facilities processing high and low sulphur content.

The study indicates that the power system configuration for refinery facilities is very close to radial systems. Therefore, the radial system configuration is chosen for the template single-line diagrams for all cracking and coking refinery facilities as shown in FIGS. 16 and 17, respectively. Each substation corresponds to a refinery process in the single-line diagrams. The motors and static loads in each substation are assumed based on various factors, such as, for example, electrical consumptions for refinery processes, motor HP and load composition. Some facilities may or may not have co-generation, and thus, co-generators 350, 352 shown in FIGS. 16 and 17 can be in service or out of service based on the practical facility plan.

Electrical consumption for each refinery process in percent of total electricity consumption for cracking refinery facilities processing high and low sulphur content is shown in Table II.

TABLE II

| | Cracking Refinery facilities | |
|---|---|---|
| Petroleum refinery Process | Processing high sulphur content | Processing low sulphur content |
| CDU(Crude Distillation Unit) | 7.179 | 2.931 |
| VDU(Vacuum Distillation Unit) | 2.243 | 10.784 |
| Hydrotreater | 26.219 | 2.340 |
| FCC(Fluid Catalytic Cracker) | 11.459 | 3.248 |
| Hydrocracker | 26.622 | 32.834 |
| Reforming | 5.855 | 0.733 |
| Alkylates | 7.872 | 1.378 |
| Isomers | 0.794 | 6.530 |
| Sulfur | 0.569 | 2.516 |
| Hydrogen | 1.740 | 3.937 |
| Gas plant | — | 3.380 |
| Other | 9.417 | 29.389 |
| Total process use | 100 | 100 |

Electrical consumption for each refinery process in percent of total electricity consumption for coking refinery facilities processing high and low sulphur content is shown in Table III.

TABLE III

| | Coking Refinery facilities | |
|---|---|---|
| Petroleum refinery Process | Processing high sulphur content | Processing low sulphur content |
| CDU(Crude Distillation Unit) | 6.330 | 2.68 |
| VDU(Vacuum Distillation Unit) | 1.978 | 9.86 |
| Hydrotreater | 23.117 | 2.14 |
| Coking | 11.832 | 8.57 |
| FCC(Fluid Catalytic Cracker) | 10.103 | 2.97 |
| Hydrocracker | 23.472 | 30.02 |
| Reforming | 5.162 | 0.67 |
| Alkylates | 6.941 | 1.26 |
| Isomers | 0.700 | 5.97 |
| Sulfur | 0.502 | 2.30 |
| Hydrogen | 1.534 | 3.60 |
| Gas plant | — | 3.09 |
| Other | 8.303 | 26.87 |
| Total process use | 100 | 100 |

The templates for cracking and coking refinery facilities processing low sulphur content and their scaling methods are particularly shown in this paper in Tables IV and V, which are developed based on power consumptions in Tables II and III. The two templates show the detailed load composition and voltage levels in each individual refinery process. The templates for cracking and coking refinery facilities processing high sulphur content and their scaling methods are also determined in this research work.

In FIGS. 16 and 17, a utility power supply 330 at 138 kV voltage level serves as the power source. Circuit breaker 332 lies between the utility power supply 330 and a 138 kV utility bus 334. Two main transformers 340, 342 are connected to the 138 kV utility bus 334 and step down the voltage from 138 kV to 13.8 kV. Their secondary windings are connected to a 13.8 kV system main bus 354. Circuit breakers 336, 338, 346 and 348 lie between the 138 kV utility bus 334 and the system main bus 354.

Each refinery process CDU 356, VDU 358, Hydrotreater 360, FCC 362, Hydrocracker 364, Reformer 366, Alkylates 368, Isomers 370, Sulfur 272, Hydrogen 374, Gasplant 376 and Other 378, is modeled as a substation, which includes static loads and induction motor loads. FIG. 17 also has a Coking process 380. Some processes also have synchronous motor loads. Induction motors are divided into three groups based on their voltage levels, 0.46 kV, 2.3 kV and 4 kV, in each process. There is a step-down transformer converting the voltage from 13.8 kV to the required bus voltage levels, 0.48 kV, 2.4 kV and 4.16 kV, for each corresponding motor group. A 100 ft cable is connected to the primary of each step-down transformer, and a 2000 ft cable served as the main cable of each substation, which is connected to the 13.8 kV system main bus 354.

In order to simplify the full template model, the static loads of each process add up together to form the lumped static loads for the whole facility, which are connected to the 13.8 kV main bus 354 in the mathematical model.

Based on the available input data, the loads contained in each process of the refinery facility can be determined using the template and the scaling method as shown in Tables IV or V. The load model for each process and thus the overall system are then established.

Criteria for the template scaling for a cracking refinery facility processing low sulphur crude oil (based on the given power demand in MW) is shown in Table IV.

TABLE IV

| Scaling Criteria | Hydro-treater | FCC | Hydro-cracker | CDU | Reform-ing | Alkyl-ates | VDU | Iso-mers | Sul-fur | Hy-drogen | Gas-plant | Other | All |
|---|---|---|---|---|---|---|---|---|---|---|---|---|---|
| 1. Rated loads for the process in % of system total loads | 2.34 | 3.25 | 32.83 | 2.93 | 0.73 | 1.38 | 10.78 | 6.53 | 2.52 | 3.94 | 3.38 | 29.39 | 100 |
| 2. Rated Static loads in % of system total loads | 0 | 1.508 | 5.384 | 1.343 | 0.537 | 1.002 | 5.113 | 1.043 | 1.397 | 0 | 1.510 | 9.940 | 28.78 |

TABLE IV-continued

| Scaling Criteria | Hydro-treater | FCC | Hydro-cracker | CDU | Reform-ing | Alkyl-ates | VDU | Iso-mers | Sul-fur | Hy-drogen | Gas-plant | Other | All |
|---|---|---|---|---|---|---|---|---|---|---|---|---|---|
| 3. Rated synchronous motor MW in % of system total loads | 1.32 | 0 | 12.84 | 0 | 0 | 0 | 0 | 0 | 0 | 3.02 | 0 | 0 | 17.18 |
| 4. Rated induction motor MW in % of system total loads | 1.02 | 1.742 | 14.606 | 1.587 | 0.193 | 0.378 | 5.667 | 5.487 | 1.123 | 0.92 | 1.870 | 19.45 | 54.04 |
| 5. 460 V induction motor MW in % of system total loads | 0.047 | 0.719 | 1.605 | 0.151 | 0.193 | 0.113 | 2.305 | 0.189 | 1.039 | 0.062 | 0.548 | 1.480 | 8.45 |
| 6. 2.3 KV induction motor MW in % of system total loads | 0.973 | 0.454 | 0 | 1.436 | 0 | 0.265 | 0.265 | 0 | 0.084 | 0 | 0.718 | 3.929 | 8.12 |
| 7. 4 KV induction motor MW in % of system total loads | 0 | 0.568 | 13 | 0 | 0 | 0 | 3.098 | 5.298 | 0 | 0.858 | 0.604 | 14.04 | 37.48 |
| 8. 460 V induction motors HP sizes, HP | 200 | 200 | 200 350 800 1000 | 200 | 200 | 200 | 200 1200 1500 | 200 | 1000 1500 | 200 | 200 | 200 | |
| 9. 2.3 KV induction motors HP sizes, HP | 350 800 | 350 | N/A | 350 800 | 350 | 350 | 350 | N/A | 350 | N/A | 350 | 350 800 | |
| 10. 4 KV induction motors HP sizes, HP | N/A | 350 | 350 2000 3000 4000 | N/A | N/A | N/A | 350 1000 | 1500 5500 | 350 | 350 | 800 | 350 800 1000 1500 | |
| 11. Power factor of static loads, % | 90 | 90 | 90 | 90 | 90 | 90 | 90 | 90 | 90 | 90 | 90 | 90 | 90 |

Criteria for the template scaling for a coking refinery facility processing low sulphur crude oil (based on the given power demand in MW) is shown in Table V.

TABLE V

| Scaling Criteria | Hydro treater | FCC | Hydro cracker | Coking/Thermal crack-ing | CDU | Reform-ing | Alkyl-ates | VDU | Iso-mers | Sul-fur | Hy-drogen | Gas Plant | Other | All proc-esses |
|---|---|---|---|---|---|---|---|---|---|---|---|---|---|---|
| 1. Rated loads for the process in % of system total loads | 2.14 | 2.97 | 30.02 | 8.57 | 2.68 | 0.67 | 1.26 | 9.86 | 5.97 | 2.3 | 3.6 | 3.09 | 26.87 | 100 |
| 2. Rated Static loads in % of system total loads | 0 | 1.38 | 4.92 | 2.74 | 1.23 | 0.49 | 0.91 | 4.68 | 0.95 | 1.27 | 0 | 1.38 | 9.09 | 29.04 |

TABLE V-continued

| Scaling Criteria | Hydro treater | FCC | Hydro cracker | Coking/ Thermal cracking | CDU | Reforming | Alkylates | VDU | Isomers | Sulfur | Hydrogen | Gas Plant | Other | All processes |
|---|---|---|---|---|---|---|---|---|---|---|---|---|---|---|
| 3. Rated synchronous motor MW in % of system total loads | 1.21 | 0 | 11.74 | 0 | 0 | 0 | 0 | 0 | 0 | 0 | 2.76 | 0 | 0 | 15.70 |
| 4. Rated induction motor MW in % of system total loads | 0.93 | 1.59 | 13.36 | 5.83 | 1.45 | 0.18 | 0.35 | 5.18 | 5.02 | 1.03 | 0.84 | 1.71 | 17.78 | 55.26 |
| 5. 460 V induction motor MW in % of system total loads | 0.043 | 0.68 | 1.468 | 1.714 | 0.14 | 0.18 | 0.105 | 2.11 | 0.17 | 0.95 | 0.057 | 0.51 | 1.353 | 9.46 |
| 6. 2.3 KV induction motor MW in % of system total loads | 0.887 | 0.42 | 0 | 0.173 | 1.31 | 0 | 0.245 | 0.24 | 0 | 0.08 | 0 | 0.66 | 3.592 | 7.60 |
| 7. 4 KV induction motor MW in % of system total loads | 0 | 0.52 | 11.892 | 3.943 | 0 | 0 | 0 | 2.83 | 4.85 | 0 | 0.783 | 0.55 | 12.84 | 38.20 |
| 8. 460 V induction motors HP sizes, HP | 200 | 200 | 200 | 200 350 800 1000 | 200 | 200 | 200 | 200 1200 1500 | 200 | 1000 1500 | 200 | 200 | 200 | |
| 9. 2.3 KV induction motors HP sizes, HP | 350 800 | 350 | N/A | 350 800 | 350 | 350 | 350 | N/A | 350 | N/A | 350 | 350 800 | 350 800 | |
| 10. 4 KV induction motors HP sizes, HP | N/A | 350 | 350 2000 3000 4000 | N/A | N/A | N/A | 350 1000 | 1500 5500 | 350 | 350 | 800 | 350 800 1000 1500 | N/A | |
| 11. Power factor of static loads, % | 90 | 90 | 90 | 90 | 90 | 90 | 90 | 90 | 90 | 90 | 90 | 90 | 90 | 90 |

In order to demonstrate how to use the template and its scaling method for a case-specific refinery facility, a 108 MW coking refinery facility is used as an example. Since the 108 MW sample facility is the coking facility, so Table V should be used as the template. The coking process is determined consisting of the loads as shown in Tables VI and VII. The cables and transformers data for the process are shown in Table VIII. The single-line diagram of the coking process is shown in FIG. 18.

Figure 18:
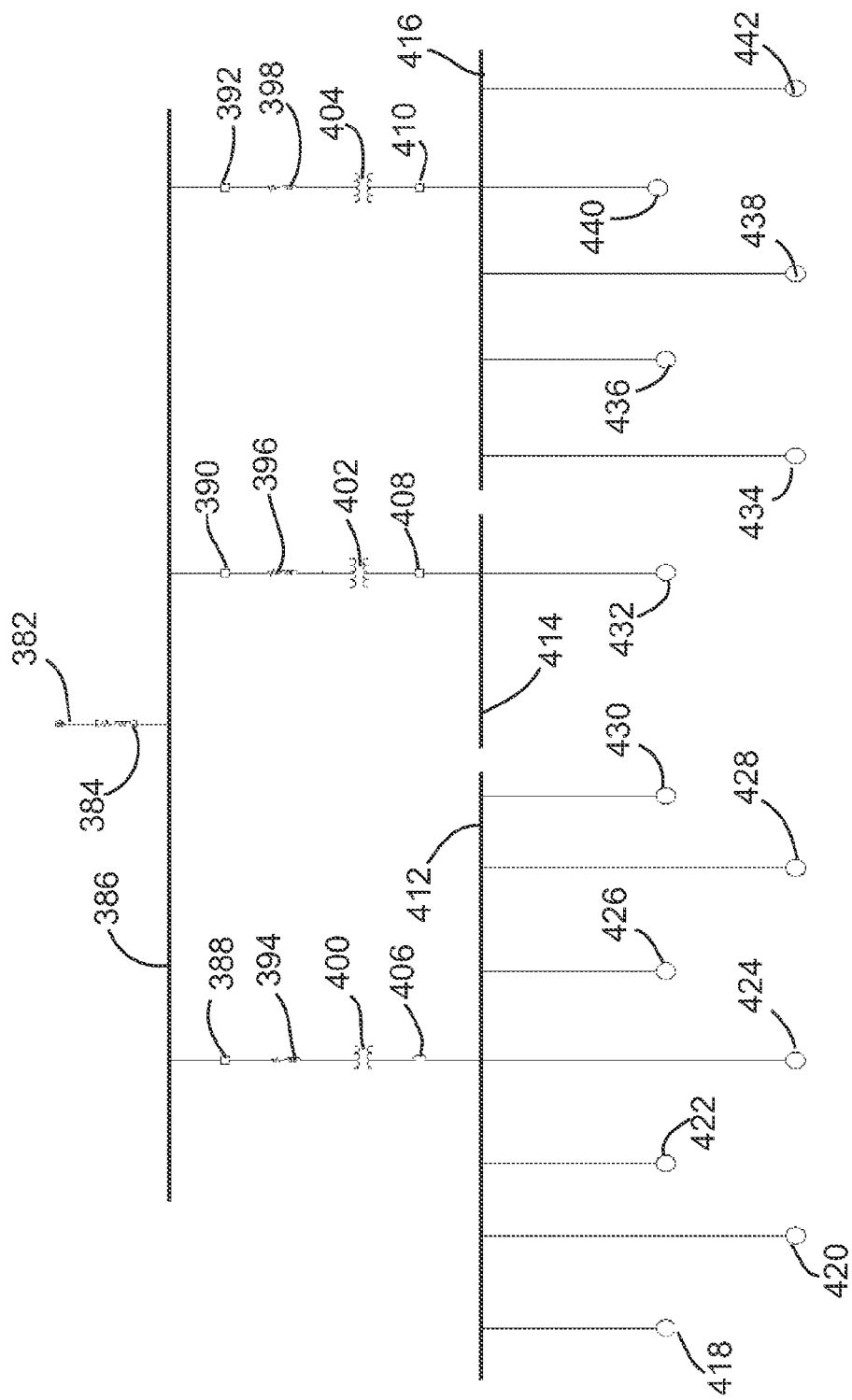
FIG. 18 is a schematic drawing of an example template single-line diagram of the Coking/Thermal cracking process for a 108 MW coking oil refinery facility.

In FIG. 18, a main bus 382, is connected by a 2000 ft cable 384 to a mainbus 386. The mainbus 386 is connected to a first bus 412, a second bus 414 and a third bus 416. Between the coking bus 412 and the mainbus 386 is a circuit breaker 388, a 100 ft 480V cable 394, a 3 MVA transformer 400 and a circuit breaker 406. Connected to first bus 412 are seven 0.48 kV induction motors 418, 420, 422, 424, 426, 428, and 430. Five of the induction motors 418, 420, 422, 424 and 426 are 200 HP and the other two induction motors 428 and 430 are 800 HP. Between the second bus 414 and the mainbus 386 is a circuit breaker 390, a 100 ft 2.4 kV cable 396, a 500 kVA transformer 402 and a circuit breaker 408. Connected to the second bus 414 is a 2.4 kV induction motor 432 having 350 HP. Between the third bus 416 and the mainbus 386 is a circuit breaker 392, a 100 ft 4.16 kV cable 398, a 7.5 MVA transformer 404 and a circuit breaker 410. Connected to the third bus 416 are five 4.16 kV induction motors 434, 436, 438, 440 and 442. Induction motors 434, 436 and 442 are 350 HP, induction motor 438 is 1500 HP and induction motor 440 is 3000 HP.

Figure 19:
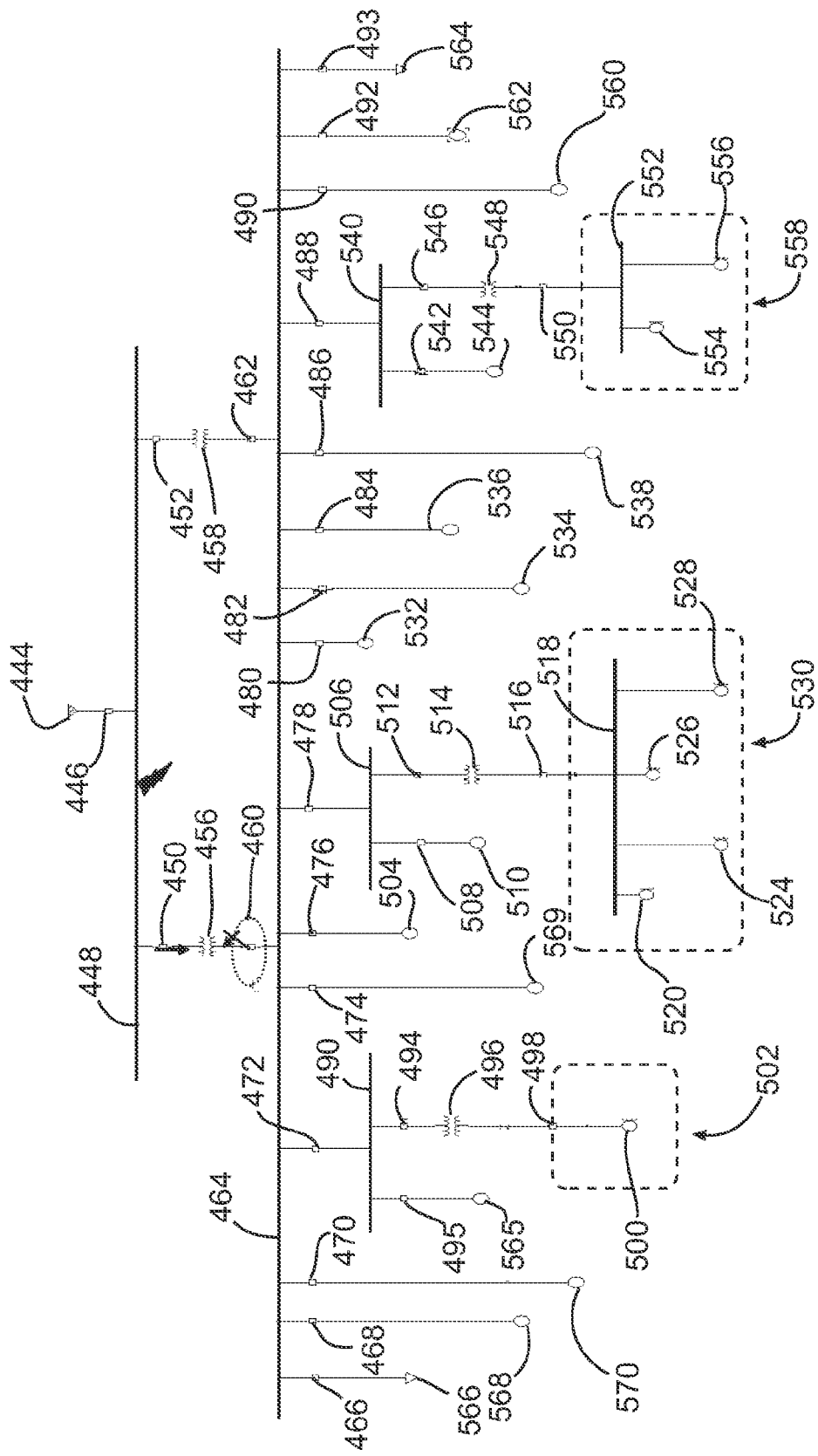
FIG. 19 is a schematic drawing of an equivalent process (EP) model for the 108 MW coking refinery facility.

In FIG. 19, a utility power supply 444 with 2500 MVA is connected across circuit breaker 446 to a 138 kV utility bus 448. The utility bus 448 is connected to a first 13.8 kV bus 464. Between the utility bus 448 and the first bus 464 are a circuit breaker 450, a 100 MVA transformer 456 and a circuit breaker 460, as well as a circuit breaker 452, a 100 MVA transformer 458 and a circuit breaker 462. Throughout the system are various circuit breakers 466, 468, 470, 472, 474, 476, 478, 480, 482, 484, 486, 488, 490, 492, 493, 494, 495, 498, 508, 512, 516, 542, 546 and 550. Connected to the first bus 464 are a 17.343 MVA lumped static load 566, a 2150 HP CDU 568, a 7550 HP VDU 570, a second 13.8 kV bus 490, an 8500 HP coking unit 569, a 2200 HP FCC 504, a third 13.8 kV bus 506, a 200 HP reforming unit 532, a 550 HP alkylates unit 534, a 7200 HP isomers unit 536, a 1500 HP sulfur unit 538, a fourth 13.8 kV bus 540, a 2450 HP gasplant 560, a 25800 HP motor aggregate representing other processes 562, and a second 17.343 MVA lumped static load 564. Connected to the second 13.8 kV bus 490 is a 1350 HP hydrotreater unit 565, and a 3 MVA hydrotreater transformer 496 and a 1750 HP 4 kV hydrotreater unit 500 which is a synchronous motor 502. Connected to the third 13.8 kV bus 506 is a 19500 HP hydrocracker 510 and a first 4.16 kV bus 518 which is in turn connected to a collection of synchronous motors 530. A 25 MVA transformer 514 lies between the third 13.8 kV bus 506 and the first 4.16 kV bus 518. The synchronous motors 530 include a 4 kV 2000 HP hydrocracker 520, a 4 kV 3000 HP hydrocracker 524, and two 4 kV 6000 HP hydrocrackers 526, 528. Connected to the fourth 13.8 kV bus 540 is a 1250 HP hydrogen processor 544 and a second 4.16 kV bus 552. A 7.5 MVA transformer 548 lies between the fourth 13.8 kV bus 546 and the second 4.16 kV bus 552. A pair of 4 kV 2000 HP hydrogen units 554 and 556 connects to the second 4.16 kV bus 552. The hydrogen units 554 and 556 are both synchronous motors 558.

Figure 20:
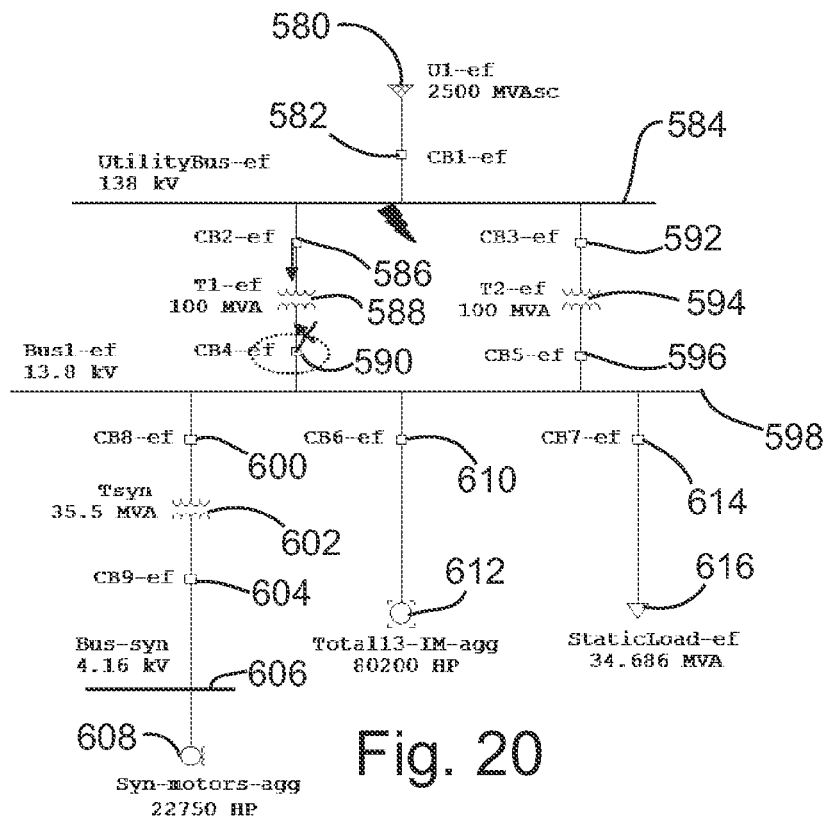
FIG. 20 is a schematic drawing of a template equivalent facility (EF) model for the 108 MW coking refinery facility.

In FIG. 20, a utility power supply 580 with 2500 MVA is connected to a 138 kV utility bus 584. Throughout the system are circuit breakers 582, 586, 592, 590, 596, 600, 604, 610 and 614. Two 100 MVA transformers 588 and 594 lie between the 138 kV utility bus 584 and a 13.8 kV bus 598. The 13.8 kV bus 598 is connected to a 35.5 MVA transformer 602 and a 4.16 kV bus 606. Connected to the 4.16 kV bus 606 is a 22750 HP synchronous motor aggregate 608. The 13.8 kV bus 598 is also connected to a 80200 HP total induction motor aggregate 612 and a 34.686 MVA static load 616.

Figure 21:
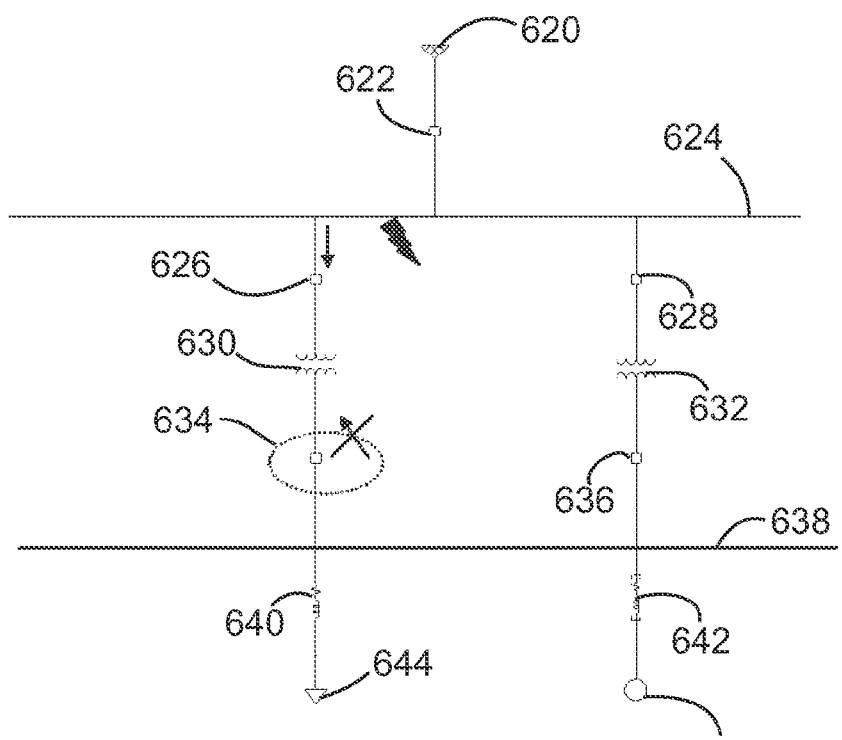
FIG. 21 is a schematic drawing of a guideline model for the 108 MW coking refinery facility.

FIG. 21 shows a guideline model for the 108 MW sample facility. A 2500 MVA utility power supply 620 is connected to a 138 kV utility bus 624. Throughout the system are circuit breakers 622, 626, 628, 634 and 636. The 138 kV utility bus 624 is connected by first and second 100 MVA transformers 630, 632 to a 13.8 kV bus 638. The 13.8 kV bus 638 is connected by cables 640 and 642 to a 33.58 MVA static load 644 and a 101340 HP induction motor 646, respectively.

Load distribution of the Coking process for the 108 MW sample coking refinery facility is shown in Table VI.

TABLE VI

| Load distribution of Coking/Thermal cracking | Loads in MW | Explanations |
|---|---|---|
| Rated total loads of the process, MW | 9.256 | 8.57% of 108 MW |
| Rated static loads of the process, MW | 2.96 | 2.74% of 108 MW |
| Rated synchronous motor loads of the process, MW | 0 | 0% of 108 MW |
| Rated induction motor loads of the process, MW | 6.296 | 5.83% of 108 MW |
| 0.46 KV induction motors of the process, MW | 1.851 | 1.714% of 108 MW |
| 2.3 KV induction motors of the process, MW | 0.187 | 0.173% of 108 MW |
| 4 KV induction motors of the process, MW | 4.258 | 3.943% of 108 MW |

Voltage levels and load sizes for the coking process for the 108 MW sample coking refinery facility is shown in Table VII.

TABLE VII

| Voltage level, kV | Induction motor loads | | Synchronous motor loads | | Static loads, MW |
|---|---|---|---|---|---|
| | # | Unit size, HP | # | Unit size, HP | |
| 13.8 | — | — | — | — | 2.96 |
| 0.46 | 7 | 200, 800 | — | — | — |
| 2.3 | 1 | 350 | — | — | — |
| 4 | 5 | 350, 1500, 3000 | — | — | — |

Cables and transformers data for the Coking process for the 108 MW sample facility is shown in Table VIII.

TABLE VIII

| Cables | Transformers |
|---|---|
| Cable-480 V-Coking, 100 ft | T1- Coking, 3.0 MVA @ 13.8 KV/0.48 KV |
| Cable-2.4 kV-Coking, 100 ft | T2- Coking, 0.5 MVA @ 13.8 KV/2.4 KV |
| Cable-4.16 kV-Coking, 100 ft | T3- Coking, 7.5 MVA @ 13.8 KV/4.16 KV |
| Cable-Coking (main cable), 2000 ft | |

Comparison of Three Template Models for Oil Refinery Facilities

The accuracy of the three facility template models, the full template (FT) model (FIG. 17), the equivalent process (EP) model (FIG. 19) and the equivalent facility (EF) model (FIG. 20), for the 108 MW sample facility is evaluated by comparing their dynamic responses for the following two events:

1). Event 1 is the circuit breaker switching for circuit breaker 346 (FIG. 17), circuit breaker 460 (FIG. 19), circuit breaker 590 (FIG. 20). The three circuit breakers are switched open at 1.0 second and switched close at 1.15 seconds. Total simulation time is 5 seconds.

2). Event 2 is a 3-phase fault applies at the 138 kV utility main bus, UtilityBus 334 (FIG. 17), UtilityBus 448 (FIG. 19) and UtilityBus 584 (FIG. 20). The fault starts at 1.0 second, and it is cleared at 1.15 seconds. Total simulation time is 5 seconds.

Testing shows that the dynamic responses for the three template models during the two events indicate that the three models have very good agreements each other, which verifies the effectiveness of the aggregation algorithms for induction motors and synchronous motors.

The EP and EF equivalent models have the similar accuracy compared to the full template model. The EP model, on the other hand, has more physical meaning for the load model since each branch of the circuit represents a refinery process, while the EF model has the simplest format. The users can choose either equivalent model based on their practical needs.

In order to demonstrate the advantage of the facility template method proposed over the current utility practice for industrial facilities modeling, the guideline method, a guideline model is built for the 108 MW sample facility. The guideline model is constructed using the criteria with a 30% static load and a 70% induction motor load.

For the 108 MW sample facility, a 32.4 MW static load and a 75.6 MW (101340 HP) induction motor are used. The locked rotor impedance of the 101340 HP induction motor is assumed to be approximately 25%. The typical induction motor data for large industrial motors has been proposed in previous research as follows: $R_S$=0.013 p.u., $X_S$=0.067 p.u., $X_m$=3.80 p.u., $R_r$=0.009 p.u., and $X_r$=0.17 p.u. These equivalent circuit parameters are used for the 101340 HP induction motor. The inertia of the induction motor is considered to be a function of its HP size. A larger HP motor has a larger inertia. The inertia of the 101340 HP motor is assumed to be 381 kg-m$^2$. The electrical single-line diagram of the guideline model is shown in FIG. 21.

Event 2, a 3 phase fault, is applied to the 138 kV UtilityBus. The full template model considers detailed characteristics of each individual induction motors and synchronous motors, the equivalent process model and the equivalent facility model is an aggregation of main characteristics of all electrical machines. However, the guideline model is just a simple representation by a large assumed induction motor. The failure of the guideline model shows that the failure to represent loads in sufficient detail produces results that miss significant phenomena.

Due to the ignorance of detailed characteristics of induction motors and the complete ignorance of the existence of synchronous motors in the guideline model, there are huge differences of the dynamic responses between the guideline model and the three facility template models. The MW and voltage angle responses show much less oscillation for the guideline model than for the three facility template models during the dynamic oscillation. On the other hand, the guideline model does not have a good recovery with different steady-state MW and steady-state voltage angles after the dynamic oscillation compared to the pre-fault conditions. The MVAR response of the guideline model is even worse than the MW and voltage angle responses due to the huge different steady-state MVAR value after the dynamic oscillation.

The facility-template method shows significant advantages over the guideline method for adequate representation of an electric power system.

Sensitivity Study for Established Templates for Oil Refinery Facilities

The main idea of the template method for the industrial facilities modeling is to create the facility template model with very limited information. For example, only the size of 108 MW of the coking refinery facility is given, other information remains unknown. For this 108 MW sample facility, the template proposed in Table V should be used to create the full template model. Once the full template model is established, the equivalent process model and the equivalent facility model can be obtained through the model equivalence process.

However, due to limited resources for the research, the template proposed in Table V in the form of power consumption for each process may be different from practical refinery facilities. Each facility operates under different operating conditions, which also makes power consumptions for the processes not constant for different facilities. Therefore, it is very important to evaluate if the variation of power consumptions for the processes have significant influence on dynamic responses of the established models.

In order to evaluate such influence, a sensitivity study is performed for the established template models for the 108 MW sample facility. The following two cases are investigated: 1) Case 1: The template with the power consumption for each process the same as that in Table V. 2) Case 2: The modification of Case 1 with the updated power consumptions at Hydrocracker and FCC. Compared to Case 1, total 7000 HP induction motors are removed from the Hydrocracker process, in the meanwhile total 7000 HP induction motors are added in the FCC process.

The power consumptions at Hydrocracker and FCC process for Cases 1 and 2 are summarized in Table IX. Power consumptions for other processes remain unchanged as shown in Table V.

Power consumptions of Hydrocracker and FCC for Cases 1 and 2 is shown in Table IX.

TABLE IX

| | Rated loads of the process in % of total rated power demand of 108 MW | |
|---|---|---|
| Processes | Case 1 - Template | Case 2 - new case |
| Hydrocracker | 30.02 | 25.18 |
| FCC | 2.97 | 7.81 |

The case and sensitivity studies have been conducted using the proposed template modeling method for a 108 MW coking oil refinery facility. The template models show significantly improved accuracy over the guideline model. The equivalent models also have good agreements with the full template model on the system dynamic responses, which verifies that the model equivalence algorithms are accurate. The template modeling approach for industrial facilities will provide adequate model for various power systems studies.

The creation of electrical models by the methods described above can apply to a wide variety of different types of power consuming facilities. Applications of the models include but are not limited to power flow studies, power system short-circuit calculations, power system stability simulations and electromagnetic transient simulations and other methods used for improving power system operation and construction. The facility models may be different for different types of studies. The facilities may consume or generate electricity. Examples of power consuming facilities are oil refineries, steel mills and airports. Examples of power generating facilities are wind farms and other non-utility generators. The power systems may thus be operated based on the facility specific model by changing operational parameters or altering system components suggested by application of the facility specific models. For example, a power system simulation study using the facility specific models may reveal unacceptable voltage depression in the system if some power lines are tripped. Based on the information, a power system planner may develop options, such as adding a voltage support device at a particular location in the system, to reinforce the system. Planner may use computer simulation based on the facility specific models to verify the effectiveness of the options. The best option may be implemented. This material change to the system will results in a strong power system under contingency conditions. In yet another example, a power system operator may use power system simulation with the facility specific model to determine more accurate operating margin of the system. The findings may results in increased level of power export to a neighboring utility system. In this case, some of the generators will generate more power for export. In a third example, a facility specific model based study may indicate a circuit breaker may be underrated and its damage may result in safety hazard. This may necessitate the replacement of the circuit breaker.

Figure 22:
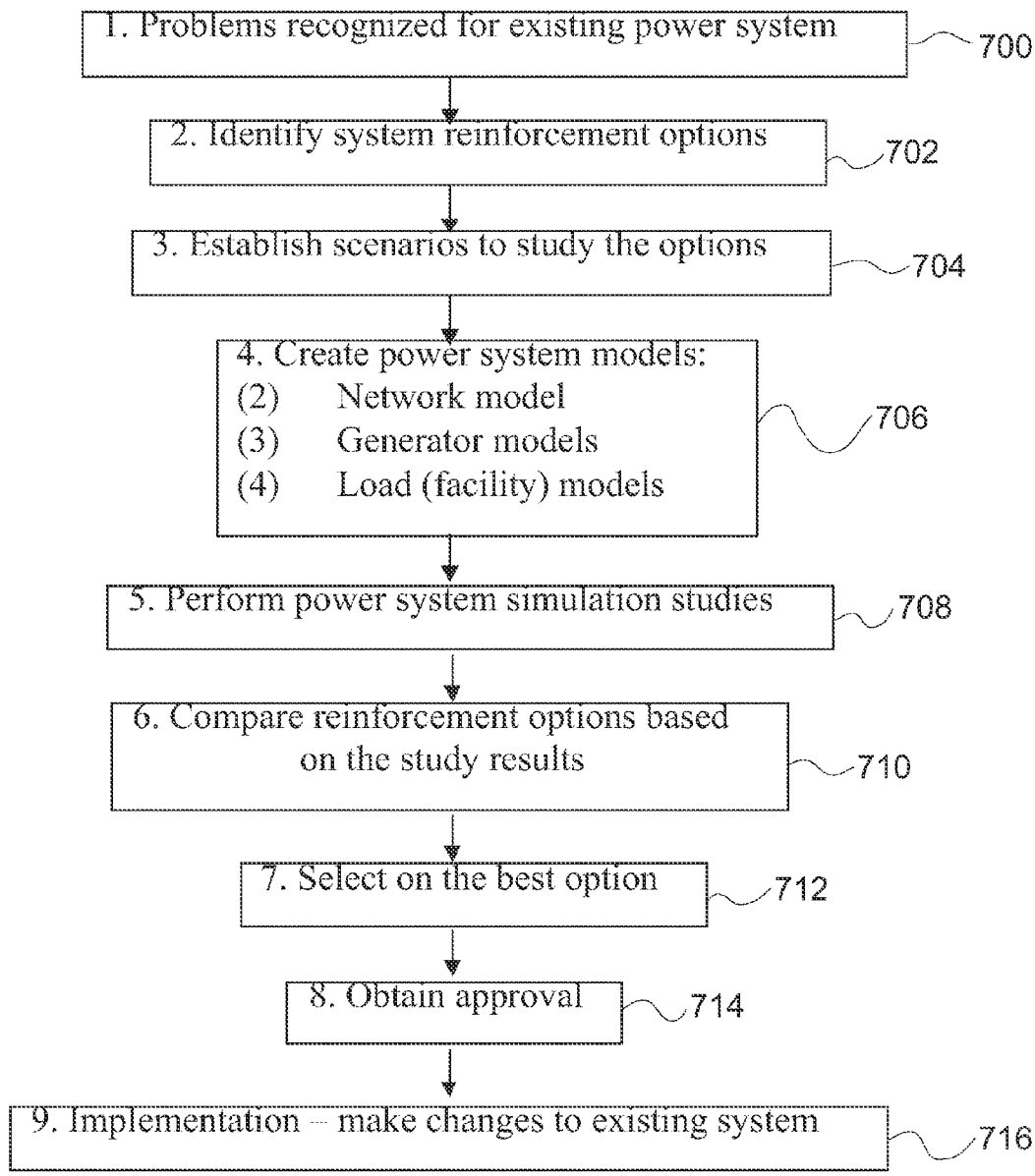
FIG. 22 is a flow chart of a system planning process.
Figure 23:
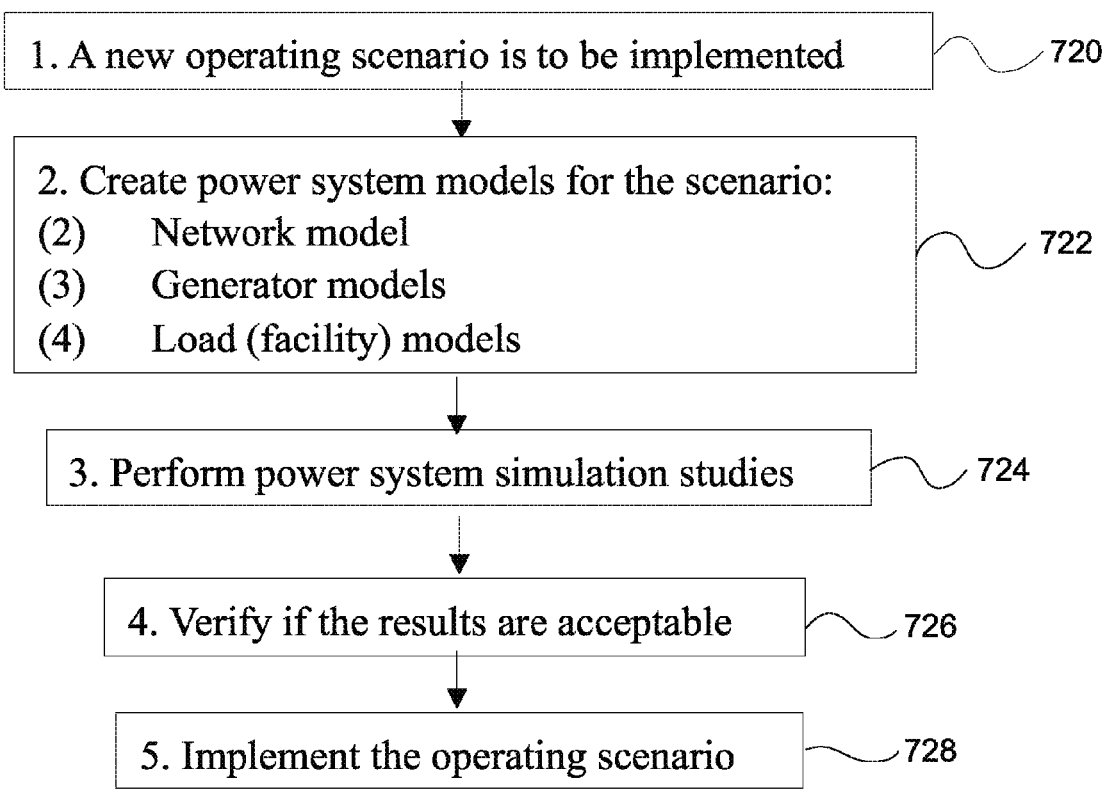
FIG. 23 is a flow chart of a system operating process.

Referring to FIG. 22, a system planning process is shown. The existing system is constructed for a certain load level. With load growth, the system may not be able to supply the added load. A problem of supplying load is then recognized in step 700. In step 702, various options to increase the system capability are identified. For example, add a new transmission line between two particular points of a system is an option. In step 704 study scenarios are formulated by considering the various options and the conditions of existing power system. In step 706 computer models are built for each study scenario. The model of a power system includes those of network, generators and loads. Some of the loads are large facilities. In step 708 the models are then used to conduct power system simulation studies. The goal of the studies is to find out the performance of the future power system with the various options added. In step 710 the simulation results for various reinforcement options are then compared. Example results are the operating margins of the system, total losses of the system, voltage profiles of the system etc. The costs of implementing the options are also compared. Based on the study results and economic analysis, the best option is then selected in step 712. In step 714 the option is submitted for approval by management and government If it is approved, the option is implemented in step 716. For example a new line is added to the existing system Referring to FIG. 23, a system operating process is shown. An existing power system is subject to various changes. In step 720 a change is being considered. For example, a power line may need to be shutdown for maintenance. The system without the power line is a new operating scenario. Computer simulation studies must be performed to evaluate if the new scenario is operable. In step 722, computer models are built for the scenario. The model of a power system includes those of network, generators and loads. Some of the loads are large facilities. In step 724 the models are then used to conduct power system simulation studies. The goal of the study is to find out if the proposed operating scenario is feasible. In step 726 the simulation results are used to verify if the scenario is feasible. Example results are the operating margins of the system, currents flowing in certain power lines, voltage profiles of the system etc. If the results indicate there is no violation of the established safe system operation limits, such as there is no overload of transformers or no low voltages, the scenario is considered feasible. In step 728 the operator then executes the scenario such as switching off a line. If the scenario is not feasible, more changes may be made to the system. This creates new operating scenarios. The above process is then repeated.

In the embodiments described above, template specific equivalencing methods are applied following an identification of the facility type and scaling of the template. However, it is possible to create an equivalent model from a template or other source prior to identifying the facility type and applying scaling methods. For each type of facility an equivalence model could be created prior to acquiring facility specific parameters. Then when the facility specific parameters are acquired, scaling methods can be applied to the equivalence model that has been created for that facility type, leading to the generation of a facility specific model by modifying the facility model. In other words, the facility model may be stored in a form of a pre-established equivalence model.

Immaterial modifications may be made to the embodiments described here without departing from what is covered by the claims.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A non-transitory computer readable memory having recorded thereon statements and instructions for execution by a computer to carry out the method steps comprising generating a facility specific model by modifying a general facility model using facility specific parameters, in which modifying the general facility model comprises modifying the general facility model using the facility specific parameters to create a modified facility model and generating a simplified equivalent model from the modified facility model to form the facility specific model.

2. The non-transitory computer readable memory of claim 1 in which the method steps comprise instructions for acquiring facility specific parameters for a facility.

3. The non-transitory computer readable memory of claim 2 in which the facility specific parameters comprises an indication of facility-type of the facility.

4. The non-transitory computer readable memory of claim 3 in which the method steps comprise selecting the general facility model to be modified based on the indication of facility-type.

5. The non-transitory computer readable memory of claim 1 in which the facility specific parameters comprise predicted values or actual values of power demand for the facility.

6. The non-transitory computer readable memory of claim 5 in which the method step of modifying the general facility model further comprises scaling the general facility model based on the predicted values or actual values of power demand for the facility.

* * * * *